United States Patent
Nakagawa

(10) Patent No.: US 11,601,072 B2
(45) Date of Patent: Mar. 7, 2023

(54) ACTUATOR

(71) Applicant: TOYOTA JIDOSHA KABUSHIKI KAISHA, Toyota (JP)

(72) Inventor: Shuji Nakagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 17/492,798

(22) Filed: Oct. 4, 2021

(65) Prior Publication Data

US 2022/0115964 A1  Apr. 14, 2022

(30) Foreign Application Priority Data

Oct. 12, 2020 (JP) .............................. JP2020-172020

(51) Int. Cl.
 *H02N 2/06* (2006.01)
 *H02N 2/04* (2006.01)

(52) U.S. Cl.
 CPC ................. *H02N 2/06* (2013.01); *H02N 2/04* (2013.01)

(58) Field of Classification Search
 CPC .......... H02N 2/06; H02N 2/04; H02N 2/0095; H02N 2/001; H02N 2/0075; H02N 1/006; H01L 41/047; H01L 41/0913
 See application file for complete search history.

(56) References Cited

U.S. PATENT DOCUMENTS 6,028,689 A * 2/2000 Michalicek ........ G02B 26/0841
359/223.1
7,457,019 B2 * 11/2008 Nanjyo ................ G02B 6/3518
359/199.1
2010/0309603 A1 * 12/2010 Poh ........................ H02N 13/00
361/234

FOREIGN PATENT DOCUMENTS

| JP | H05185383 A | 7/1993 |
| JP | H08308270 A | 11/1996 |
| JP | 2005245151 A | 9/2005 |
| JP | 5714200 B2 | 5/2015 |
| WO | 0106575 A1 | 1/2001 |

OTHER PUBLICATIONS

Shuji Nakagawa et al., U.S. Appl. No. 17/597,705, filed Jan. 19, 2022.

* cited by examiner

*Primary Examiner* — Emily P Pham
(74) *Attorney, Agent, or Firm* — Dickinson Wright, PLLC

(57) ABSTRACT

Provided is a novel actuator that can easily achieve movement with multiple degrees of freedom. An actuator includes a flexible electrode, a first base electrode disposed to face the flexible electrode on the Y-axis and provided with a first insulating layer on an opposite face, a second base electrode disposed to face the flexible electrode on the X-axis and provided with a second insulating layer on an opposite face, and a first output member and a second output member adapted to be displaced according to deformation of the flexible electrode. A first space is formed between the first insulating layer and the flexible electrode, in which the flexible electrode deforms toward the first insulating layer by an applied voltage. A second space is formed between the second insulating layer and the flexible electrode, in which the flexible electrode deforms toward the second insulating layer by an applied voltage.

8 Claims, 19 Drawing Sheets

Fig. 9

| | Voltage application | | | | | Displacement amount | | | | | | |
|---|---|---|---|---|---|---|---|---|---|---|---|---|
| | First base electrode 20 | | Second base electrode 30 | | | First output member 50 | | | Second output member 60 | | | |
| | Electrode portion 25a | Electrode portion 25b | Electrode portion 35a | Electrode portion 35b | | X | Y | Z | X | Y | Z | |
| Initial state | × | × | × | × | | — | — | — | — | — | — | |
| First state | ○ | × | × | × | | -1.39 | -3.60 | 0.00 | 0.00 | 0.00 | 0.00 | |
| Second state | × | ○ | × | × | | +1.39 | -3.60 | 0.00 | 0.00 | -7.00 | 0.00 | |
| Third state | ○ | ○ | × | × | | 0.00 | -7.00 | 0.00 | 0.00 | -7.00 | 0.00 | |
| Fourth state | ○ | × | ○ | × | | -5.08 | -4.03 | -0.10 | -3.60 | 0.00 | +1.39 | |
| Fifth state | ○ | × | × | ○ | | -5.08 | -4.03 | +0.10 | -3.60 | 0.00 | -1.39 | |
| Sixth state | ○ | ○ | ○ | × | | -3.90 | -6.84 | -0.10 | -3.60 | -6.02 | +1.39 | |
| Seventh state | ○ | ○ | × | ○ | | -3.90 | -6.84 | +0.10 | -3.60 | -6.02 | -1.39 | |
| Eighth state | ○ | ○ | ○ | ○ | | -7.80 | -7.00 | 0.00 | -7.00 | -5.00 | 0.00 | |

○: Voltage is applied   ×: Voltage is not applied

ACTUATOR

CROSS REFERENCE TO RELATED APPLICATIONS

The present application claims priority from Japanese patent application JP 2020-172020 filed on Oct. 12, 2020, the entire content of which is hereby incorporated by reference into this application.

BACKGROUND

Technical Field

The present disclosure relates to actuators.

Background Art

There is known a soft actuator that performs mechanical work by using deformation of a flexible member as power (for example, JP 5714200 B).

JP 5714200 B discloses an actuator in which an electroactive polymer is sandwiched between a pair of electrodes. In the actuator disclosed in JP 5714200 B, the electrodes as a pair are attracted to each other due to the Coulomb force of the charges stored by the voltage applied across the pair of electrodes, and the electroactive polymer deforms, thereby generating a displacement between the electrodes.

SUMMARY

However, the actuator disclosed in JP 5714200 B can achieve movement with only one degree of freedom in a direction along the interelectrode distance or a direction along the electrodes. To achieve movement with multiple degrees of freedom by the actuator disclosed in JP 5714200 B, two or more actuators need to be combined, which may cause a device to have a complicated structure.

The present disclosure has been made in view of the foregoing, and provides a novel actuator that can easily achieve movement with multiple degrees of freedom.

In view of the foregoing, the actuator according to the present disclosure includes a flexible electrode having flexibility; a first base electrode disposed to face the flexible electrode on a first axis and provided with a first insulating layer on an opposite face facing the flexible electrode; a second base electrode disposed to face the flexible electrode on a second axis crossing the first axis and provided with a second insulating layer on an opposite face facing the flexible electrode; and an output member adapted to be displaced according to deformation of the flexible electrode and output work to an outside, in which a first space is formed between the first insulating layer and the flexible electrode, in which the flexible electrode deforms toward the first insulating layer by a voltage applied across the first base electrode and the flexible electrode, and a second space is formed between the second insulating layer and the flexible electrode, in which the flexible electrode deforms toward the second insulating layer by a voltage applied across the second base electrode and the flexible electrode.

With such a configuration, the actuator according to the present disclosure can cause dielectric polarization of the first insulating layer provided in the first base electrode by the voltage applied across the first base electrode and the flexible electrode and generate a Coulomb force between the first insulating layer and the flexible electrode. The actuator can cause the flexible electrode to deform along the first axis by using the effect of the Coulomb force generated between the first insulating layer and the flexible electrode. In the same manner, the actuator can cause dielectric polarization of the second insulating layer provided in the second base electrode by the voltage applied across the second base electrode and the flexible electrode and generate a Coulomb force between the second insulating layer and the flexible electrode. The actuator can cause the flexible electrode to deform along the second axis by using the effect of the Coulomb force generated between the second insulating layer and the flexible electrode. The actuator can cause the output members to be displaced along the first axis and the second axis according to the deformation of the flexible electrode along the first axis and the second axis, respectively. Therefore, with only one actuator provided with one flexible electrode, the actuator according to the present disclosure can easily achieve movement with multiple degrees of freedom, even without combining two or more actuators.

In addition, the actuator according to the present disclosure can detect a deformation amount of the flexible electrode by detecting an amount of electric charge stored in the flexible electrode and can detect a displacement amount of the output member by using a known method. That is, the actuator can detect the displacement amount of the output member without newly introducing a detection device separate from the actuator. Therefore, the actuator according to the present disclosure can control the movement with multiple degrees of freedom with a simple configuration.

In some embodiments, the first base electrode and the second base electrode each include a plurality of electrode portions adapted to independently receive the voltage.

With such an aspect, since the first base electrode can control the voltage applied across the first base electrode and the flexible electrode for each of the plurality of electrode portions, the first base electrode can control the Coulomb force acting on the flexible electrode for each of the plurality of electrode portions. Accordingly, the first base electrode can cause the flexible electrode to deform in a more complicated and fine manner as compared to the first base electrode not including the plurality of electrode portions, thus allowing the output member to be displaced in a complicated and fine manner. Likewise, also when the second base electrode is formed of the plurality of electrode portions as described above, the second base electrode can cause the output member to be displaced in a complicated and fine manner. Therefore, the actuator can easily achieve complicated and fine movement with multiple degrees of freedom.

In some embodiments, each of the plurality of electrode portions has an inclined face that faces the flexible electrode and is inclined with respect to the flexible electrode, and the inclined faces of the plurality of electrode portions are inclined in directions different from each other.

With such an aspect, the first base electrode can cause the flexible electrode to deform toward each of the plurality of inclined faces that are inclined in the directions different from each other with respect to the flexible electrode. Accordingly, the first base electrode can cause the output member to be displaced so as to rotate in the direction crossing the first axis. In particular, by alternately applying a voltage and stopping application of the voltage between one of the plurality of electrode portions and the other one of the plurality of electrode portions, the first base electrode can switch the deformation direction of the flexible electrode between the direction toward the inclined face of the one electrode portion and the direction toward the inclined face of the other electrode portion alternately. Accordingly, the first base electrode can cause the output member to be displaced so as to swing in the direction crossing the first axis. Likewise, also when the plurality of electrode portions forming the second base electrode has the inclined faces as described above, the second base electrode can cause the output member to be displaced so as to rotate or swing in the direction crossing the second axis. Therefore, the actuator can easily achieve various types of movement, in addition to the transitional movement along the first axis or the second axis.

In some embodiments, the plurality of electrode portions forming the first base electrode is disposed along a direction rotating about the first axis, and the plurality of electrode portions forming the second base electrode is disposed along a direction rotating about the second axis.

With such an aspect, the first base electrode can sequentially apply a voltage or sequentially stop application of the voltage across the first base electrode and the flexible electrode for each of the plurality of electrode portions along the direction rotating about the first axis. The first base electrode can sequentially cause the flexible electrode to deform toward each of the plurality of electrode portions disposed along the direction rotating about the first axis. Accordingly, the first base electrode can cause the output member to be displaced so as to precess about the first axis as a rotation axis. Likewise, also when the second base electrode is formed of a plurality of electrode portions as described above, the second base electrode can cause the output member to be displaced so as to precess about the second axis as a rotation axis. Therefore, the actuator can easily achieve various types of movement, in addition to the transitional movement along the first axis or the second axis.

In some embodiments, the flexible electrode has a hollow structure.

With such an aspect, the flexible electrode can deform more easily as compared to the flexible electrode with a solid structure. Accordingly, the actuator can cause the flexible electrode to deform even if a voltage applied to the flexible electrode is reduced. This can reduce power consumption and easily ensure insulation, and thus can increase safety. In addition, the actuator can reduce its weight and cost as compared to the one in which the flexible electrode has a solid structure. Therefore, the actuator can achieve movement with multiple degrees of freedom more easily and safely.

In some embodiments, the actuator further includes a movable base electrode disposed opposite to the first base electrode with at least a portion of the flexible electrode interposed therebetween on the first axis and adapted to move along the first axis with respect to the first base electrode, in which the movable base electrode is provided with an insulating layer on an opposite face facing the flexible electrode, and a space is formed between the insulating layer of the movable base electrode and the flexible electrode, in which the movable base electrode moves by a voltage applied across the movable base electrode and the flexible electrode.

With such an aspect, the actuator can cause the Coulomb force generated between the insulating layer of the first base electrode and the flexible electrode to act on the flexible electrode. In addition, the actuator can cause the Coulomb force generated between the insulating layer of the movable base electrode and the flexible electrode to act on the flexible electrode. The direction of the Coulomb force generated between the insulating layer of the movable base electrode and the flexible electrode is equal to the direction of the Coulomb force generated between the first insulating layer of the first base electrode and the flexible electrode. That is, the actuator can enhance the Coulomb force that causes the flexible electrode to deform along the first axis. Since the actuator can enhance the power to cause the output member to be displaced along the first axis, it can have a higher output in the direction along the first axis. Therefore, the actuator can easily achieve movement with multiple degrees of freedom and can also increase an output.

In some embodiments, the flexible electrode is formed into a hexahedron, the hexahedron including a first face crossing the first axis, a second face facing the first face on the first axis, a third face crossing the second axis, and a fourth face facing the third face on the second axis, the opposite face of the first base electrode facing the flexible electrode faces the first face, the first space is formed between the first insulating layer provided on the opposite face of the first base electrode facing the flexible electrode and the first face, the opposite face of the second base electrode facing the flexible electrode faces the third face, the second space is formed between the second insulating layer provided on the opposite face of the second base electrode facing the flexible electrode and the third face, and the output member includes a first output member attached to the second face and a second output member attached to the fourth face.

With such an aspect, the actuator can cause the first output member and the second output member to be displaced along the first axis and the second axis, respectively, even with a simple structure including the flexible electrode, the first base electrode, and the second base electrode. Therefore, the actuator can more easily achieve movement with multiple degrees of freedom.

In some embodiments, the actuator further includes a third base electrode disposed to face the flexible electrode on a third axis crossing each of the first axis and the second axis and provided with a third insulating layer on an opposite face facing the flexible electrode, in which a third space is formed between the third insulating layer and the flexible electrode, in which the flexible electrode deforms toward the third insulating layer by a voltage applied across the third base electrode and the flexible electrode.

With such an aspect, the actuator can cause the flexible electrode to deform along the third axis in addition to the first axis and the second axis. The actuator can cause the output member to be displaced along the third axis in addition to the first axis and the second axis. Therefore, the actuator can easily achieve movement with greater degrees of freedom.

According to the present disclosure, a novel actuator that can easily achieve movement with multiple degrees of freedom can be provided.

BRIEF DESCRIPTION OF THE DRAWINGS

FIG. 9 is a table showing the results of simulation analysis performed for the operation of the actuator illustrated in FIG. 1;

DETAILED DESCRIPTION

Figure 1:
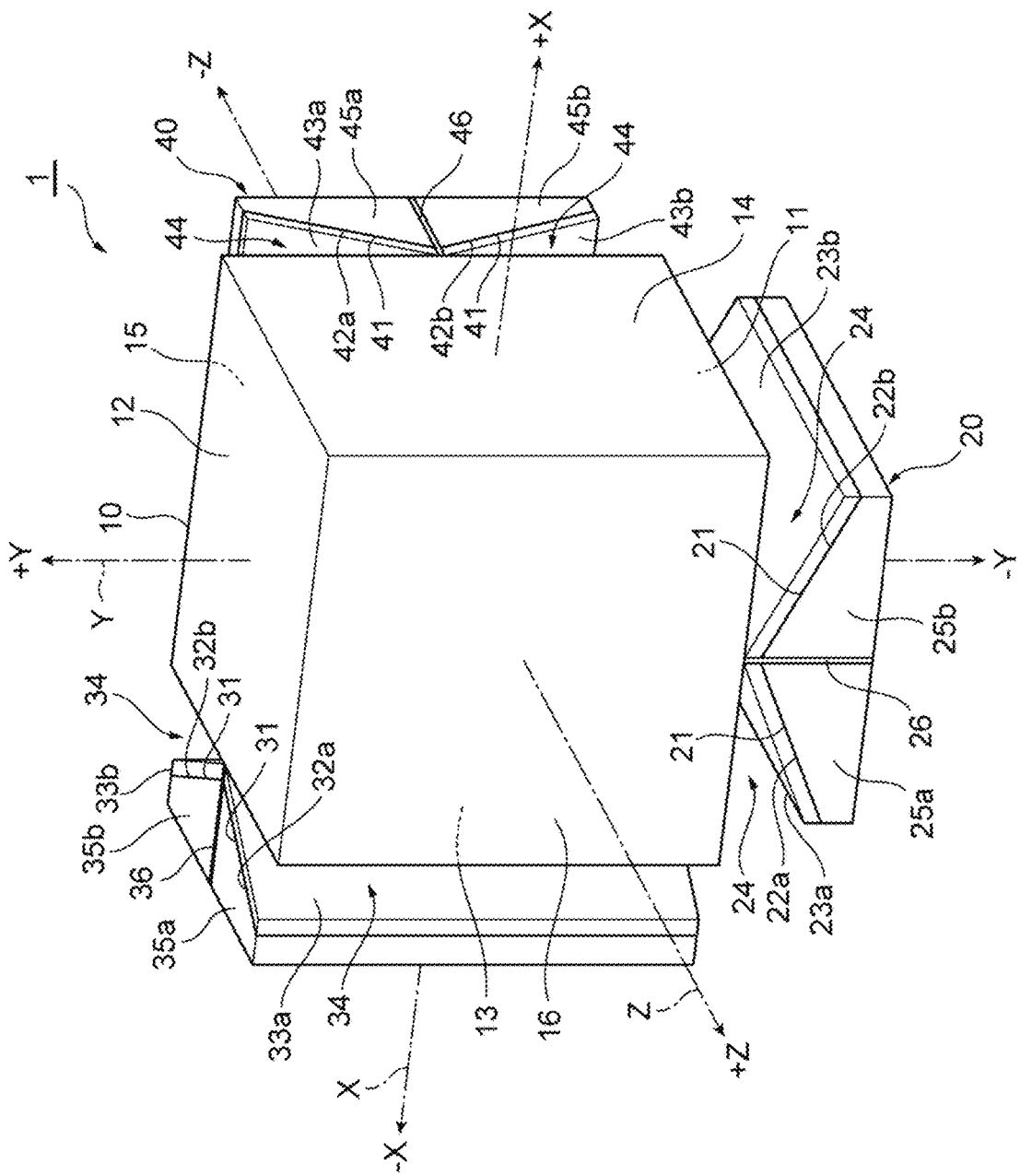
FIG. 1 is a schematic view of an actuator of a first embodiment.

Hereinafter, embodiments of the present disclosure will be described with reference to the drawings. In each of the embodiments, unless otherwise specified, the configuration denoted by the same reference numeral has the same function in the embodiments, and descriptions thereof will be omitted. In addition, orthogonal coordinate axes including the X-axis, Y-axis, and Z-axis are shown in the drawings as appropriate in order to clarify the explanation of the position of each unit.

As illustrated in FIG. 1, the origin of the orthogonal coordinate axes is the center of a flexible electrode 10 described later. However, the orthogonal coordinate axes may be shown in the margin of the drawings for the sake of simplification of the drawings. The X-axis, Y-axis, and Z-axis respectively correspond to the "second axis," "first axis," and "third axis" recited in the claims as one example.

In the present embodiment, the direction rotating about the X-axis, the direction rotating about the Y-axis, and the direction rotating about the Z-axis may also be referred to as "pitch direction," "yaw direction," and "roll direction," respectively. In the present embodiment, a first base electrode 20, a second base electrode 30, and a third base electrode 40, which will be described later, may also be collectively referred to as "base electrodes 20 to 40." In the present embodiment, a first output member 50, a second output member 60, and a third output member 70, which will be described later, may also be collectively referred to as "output members 50 to 70." In addition, in the present embodiment, the expression "A faces B" may include not only the case where a face of A facing B is parallel with a face of B facing A, but also the case where a face of A facing B is not parallel with a face of B facing A.

First Embodiment

An actuator 1 of the first embodiment will be described with reference to FIG. 1 to FIG. 13.

Figure 2:
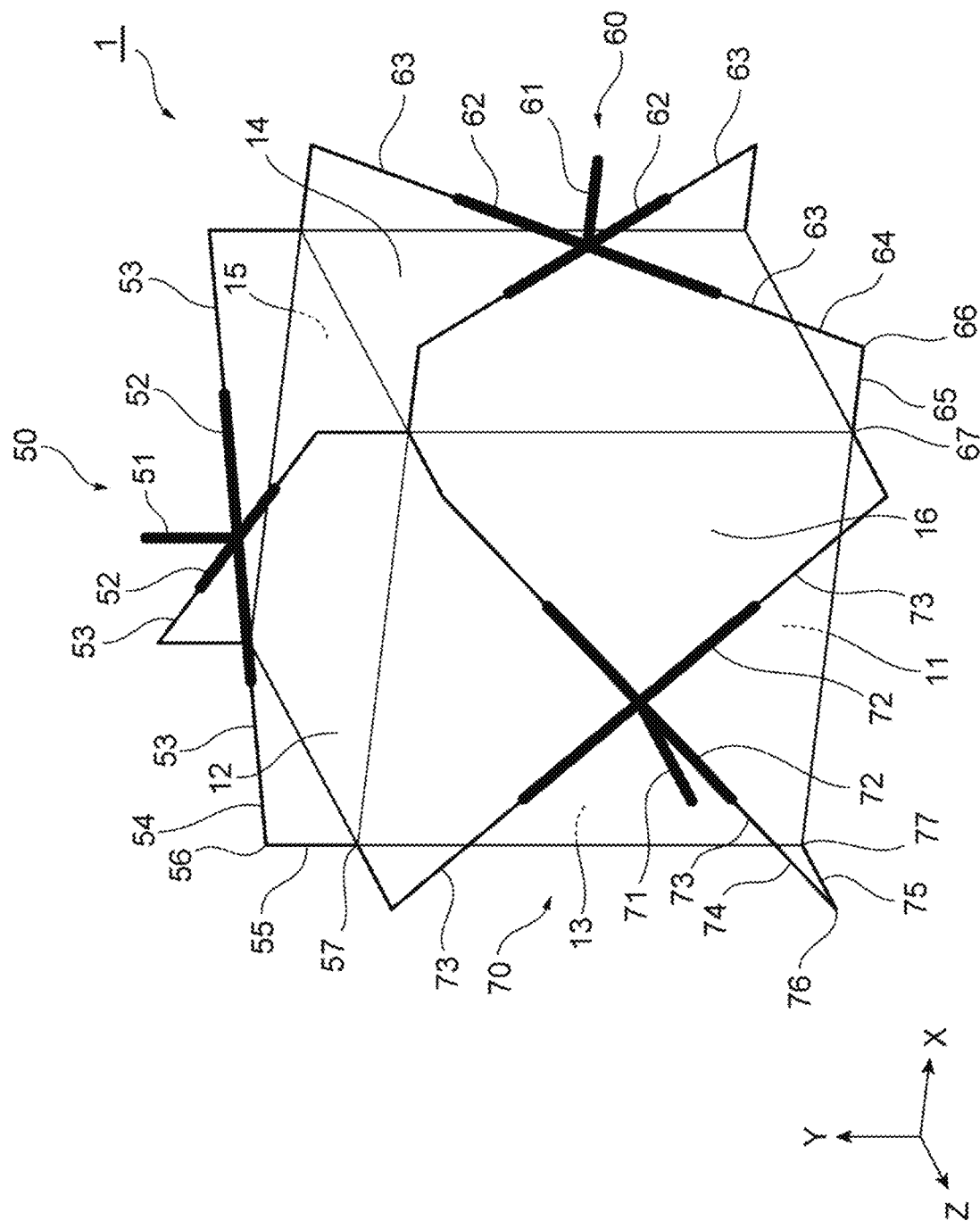
FIG. 2 is a view explaining output members provided in the actuator illustrated in FIG. 1.

FIG. 1 is a schematic view of the actuator 1 of the first embodiment. FIG. 2 is a view explaining the output members 50 to 70 provided in the actuator 1 illustrated in FIG. 1. It should be noted that the illustration of the output members 50 to 70 is omitted in FIG. 1, and the illustration of the base electrodes 20 to 40 is omitted in FIG. 2.

The actuator 1 is a soft actuator that performs mechanical work by using, as power, deformation of the flexible electrode 10 that has flexibility. In the actuator 1, the flexible electrode 10 itself deforms. This is different from the conventional soft actuator that uses, as power, deformation of a dielectric elastomer sandwiched between a pair of electrodes. The actuator 1 is applicable to various kinds of actuators used for artificial muscle or robots, for example.

The actuator 1 alone acts as an actuator that can achieve movement with multiple degrees of freedom. The actuator 1 can cause the flexible electrode 10 to three-dimensionally deform in the first axis, the second axis, and the third axis that cross each other when a voltage is applied across the base electrodes 20 to 40 and the flexible electrode 10, respectively. The actuator 1 can cause the output members 50 to 70 attached to the flexible electrode 10 to be three-dimensionally displaced according to the deformation of the flexible electrode 10, thus outputting work to the outside.

The actuator 1 includes the flexible electrode 10, the base electrodes 20 to 40, and the output members 50 to 70.

The flexible electrode 10 is formed of a flexible electric conductor. The flexible electrode 10 has flexibility such that it deforms due to the effect of the Coulomb force generated by the voltage applied across the base electrodes 20 to 40 and the flexible electrode 10 and returns to the original shape when the application of the voltage is stopped.

Examples of the material used for the formation of the flexible electrode 10 may include conductive rubber or conductive gel, for example. Examples of the conductive rubber may include an elastomer formed by mixture with a conductive material. Examples of the conductive material may include fine powder of carbon black, acetylene black, or carbon nanotube, metal fine powder of silver or copper, conductive fine powder having a core-shell structure in which an insulator of silica or alumina, for example, is coated with metal through sputtering, for example. Examples of the conductive gel may include a functional gel material obtained by retaining a solvent such as water or a humectant, an electrolyte, an additive, and the like in a three-dimensional polymer matrix. Examples of the functional gel material may include Technogel (registered trademark) available from Sekisui Kasei Co., Ltd. The flexible electrode 10 may be formed by using a viscoelastic body or an elasto-plastic body. In this case, the flexible electrode 10 may be used within a range assumed to be an elastic region, for example.

The flexible electrode 10 is formed into a three-dimensional shape. In the present embodiment, the flexible electrode 10 is formed into a polyhedron, for example, a hexahedron. The flexible electrode 10 of the present embodiment includes a first face 11 crossing the Y-axis and a second face 12 facing the first face 11 on the Y-axis. The flexible electrode 10 of the present embodiment includes a third face 13 crossing the X-axis and a fourth face 14 facing the third face 13 on the X-axis. The flexible electrode 10 of the present embodiment includes a fifth face 15 crossing the Z-axis and a sixth face 16 facing the fifth face 15 on the Z-axis. The flexible electrode 10 of the present embodiment may be formed into a three-dimensional shape such that the first face 11 and the second face 12 intersect the Y-axis, the third face 13 and the fourth face 14 intersect the X-axis, and the fifth face 15 and the sixth face 16 intersect the Z-axis.

The base electrodes 20 to 40 are formed of a rigid conductive material. Examples of the material used for the formation of the base electrodes 20 to 40 may include a metal material such as iron, copper, or aluminum. The base electrodes 20 to 40 each are formed into a plate shape. Alternatively, the base electrodes 20 to 40 each may be formed by coating with a conductive metal film, for example, one surface of a substrate formed by using a non-metal material having heat resistance, rigidity, and insulation, such as ceramics. The surface of the substrate coated with a metal film is a face facing the flexible electrode 10.

The base electrodes 20 to 40 include the first base electrode 20, the second base electrode 30, and the third base electrode 40.

The first base electrode 20 is an electrode for applying a voltage to generate a Coulomb force for causing the flexible electrode 10 to deform mainly along the Y-axis. The first base electrode 20 is disposed to face the flexible electrode 10 on the Y-axis. The first base electrode 20 has an opposite face 21 facing the flexible electrode 10. In the present embodiment, the opposite face 21 facing the flexible electrode 10 faces the first face 11 of the flexible electrode 10. The opposite face 21 facing the flexible electrode 10 is provided with first insulating layers 23a, 23b.

The first base electrode 20 may be formed of a plurality of electrode portions 25a, 25b. The plurality of electrode portions 25a, 25b is insulated from each other by a plate-like insulating portion 26. With the plate-like insulating portion 26, each of the plurality of electrode portions 25a, 25b may independently receive a voltage applied across the first base electrode 20 and the flexible electrode 10. In the present embodiment, each of the plurality of electrode portions 25a, 25b is formed into a plate shape to extend along the Z-axis. The plurality of electrode portions 25a, 25b is arranged side by side along the X-axis. The plurality of electrode portions 25a, 25b is formed on the YZ plane in a manner symmetric with each other.

The plurality of electrode portions 25a, 25b respectively has inclined faces 22a, 22b that face the flexible electrode 10 and are inclined with respect to the flexible electrode 10. That is, the opposite face 21 of the first base electrode 20 facing the flexible electrode 10 is formed of the inclined faces 22a, 22b. The inclined faces 22a, 22b are inclined with respect to the first face 11. The inclined face 22a and the inclined face 22b are inclined in the directions different from each other. The expression "the inclined face 22a and the inclined face 22b are inclined in the directions different from each other" means that the normal of the inclined face 22a is not parallel with the normal of the inclined face 22b. In the present embodiment, the normal of the inclined face 22a is inclined in the −X-axis direction with respect to the Y-axis along the normal of the first face 11. The normal of the inclined face 22b is inclined in the +X-axis direction with respect to the Y-axis along the normal of the first face 11. The opposite face 21 facing the flexible electrode 10, formed of the inclined faces 22a, 22b, protrudes in the +Y-axis direction and is formed into a crest shape having a ridge along the Z-axis.

The first insulating layers 23a, 23b are layers that insulate the first base electrode 20 from the flexible electrode 10. The first insulating layer 23a coats the inclined face 22a of the electrode portion 25a that is one of the electrode portions forming the first base electrode 20. The first insulating layer 23b coats the inclined face 22b of the electrode portion 25b that is the other one of the electrode portions forming the first base electrode 20. The first insulating layers 23a, 23b are formed by using a ferroelectric material including ceramics to surely maintain the electric charge stored in the first base electrode 20 by the voltage applied across the first base electrode 20 and the flexible electrode 10. In particular, the first insulating layers 23a, 23b are formed by using a ferroelectric material having a perovskite structure. Examples of the ferroelectric material having a perovskite structure may include barium titanate ($BaTiO_3$), lead titanate ($PbTiO_3$), lead zirconate titanate ($Pb(Zr, Ti)O_3$), lanthanum lead zirconate titanate ($(Pb, La)(Zr, Ti)O_3$), strontium titanate ($SrTiO_3$), barium strontium titanate ($(Ba, Sr)TiO_3$), or potassium sodium niobate ($(NaK)NbO_3$). The barium titanate may contain dissolved therein a substance, such as $CaZrO_3$ or $BaSnO_3$.

In addition, the material used for the formation of the first insulating layers 23a, 23b may have a high relative dielectric constant so as to generate a Coulomb force to cause the flexible electrode 10 to deform. The first insulating layers 23a, 23b may have a relative dielectric constant higher than or equal to 1000 by employing ceramics (fine ceramics), for example. The barium titanate has a relative dielectric constant in the range from about 1000 to 10000. The lead zirconate titanate has a relative dielectric constant in the range from 500 to 5000. The strontium titanate has a relative dielectric constant in the range from 200 to 500. These ferroelectric materials with a perovskite structure have a high relative dielectric constant.

The first base electrode 20 is adapted to have a first space 24 formed between the first insulating layers 23a, 23b provided on the opposite face 21 of the first base electrode 20 facing the flexible electrode 10 and the flexible electrode 10. In the present embodiment, the first space 24 is formed between the first insulating layers 23a, 23b provided on the opposite face 21 of the first base electrode 20 facing the flexible electrode 10 and the first face 11 of the flexible electrode 10. In the actuator 1, when a voltage is applied across the first base electrode 20 and the flexible electrode 10, the voltage causes dielectric polarization of the first insulating layers 23a, 23b provided in the first base electrode 20, and a Coulomb force is generated between the first insulating layers 23a, 23b and the flexible electrode 10. The Coulomb force causes the flexible electrode 10 to deform toward the first insulating layers 23a, 23b so as to adhere to the first insulating layers 23a, 23b. The first space 24 is a space for the flexible electrode 10 to deform toward the first insulating layers 23a, 23b by the voltage applied across the first base electrode 20 and the flexible electrode 10.

The second base electrode 30 is an electrode for applying a voltage to generate a Coulomb force for causing the flexible electrode 10 to deform mainly along the X-axis. The second base electrode 30 is configured in the same manner as the first base electrode 20. That is, the second base electrode 30 is disposed to face the flexible electrode 10 on the X-axis. The second base electrode 30 has an opposite face 31 facing the flexible electrode 10. In the present embodiment, the opposite face 31 facing the flexible electrode 10 faces the third face 13 of the flexible electrode 10. The opposite face 31 facing the flexible electrode 10 is provided with second insulating layers 33a, 33b.

In the same manner as the first base electrode 20, the second base electrode 30 may be formed of a plurality of electrode portions 35a, 35b. The plurality of electrode portions 35a, 35b is insulated from each other by a plate-like insulating portion 36 and each of the plurality of electrode portions 35a, 35b may independently receive a voltage applied across the second base electrode 30 and the flexible electrode 10. In the same manner as the plurality of electrode portions 25a, 25b forming the first base electrode 20, the plurality of electrode portions 35a, 35b respectively has inclined faces 32a, 32b that face the flexible electrode 10 and are inclined with respect to the flexible electrode 10. The inclined faces 32a, 32b are inclined with respect to the third face 13. The inclined face 32a and the inclined face 32b are inclined in the directions different from each other.

The second insulating layers 33a, 33b are layers that insulate the second base electrode 30 from the flexible electrode 10. The second insulating layer 33a coats the inclined face 32a of the electrode portion 35a that is one of the electrode portions forming the second base electrode 30. The second insulating layer 33b coats the inclined face 32b of the electrode portion 35b that is the other one of the electrode portions forming the second base electrode 30. In the same manner as the first insulating layers 23a, 23b, the second insulating layers 33a, 33b are formed by using a ferroelectric material including ceramics, such as barium titanate, to surely maintain the electric charge stored in the second base electrode 30, and having a high relative dielectric constant. A second space 34 is formed between the second insulating layers 33a, 33b and the flexible electrode 10, in which the flexible electrode 10 deforms toward the second insulating layers 33a, 33b by the voltage applied across the second base electrode 30 and the flexible electrode 10. In the present embodiment, the second space 34 is formed between the second insulating layers 33a, 33b provided on the opposite face 31 of the second base electrode 30 facing the flexible electrode 10 and the third face 13 of the flexible electrode 10.

The third base electrode 40 is an electrode for applying a voltage to generate a Coulomb force for causing the flexible electrode 10 to deform mainly along the Z-axis. The third base electrode 40 is configured in the same manner as the first base electrode 20. That is, the third base electrode 40 is disposed to face the flexible electrode 10 on the Z-axis. The third base electrode 40 has an opposite face 41 facing the flexible electrode 10. In the present embodiment, the opposite face 41 facing the flexible electrode 10 faces the fifth face 15 of the flexible electrode 10. The opposite face 41 facing the flexible electrode 10 is provided with third insulating layers 43a, 43b.

In the same manner as the first base electrode 20, the third base electrode 40 may be formed of a plurality of electrode portions 45a, 45b. The plurality of plurality of electrode portions 45a, 45b is insulated from each other by a plate-like insulating portion 46 and each of the plurality of electrode portions 35a, 35b may independently receive a voltage applied across the third base electrode 40 and the flexible electrode 10. In the same manner as the plurality of electrode portions 25a, 25b forming the first base electrode 20, the plurality of electrode portions 45a, 45b respectively has inclined faces 42a, 42b that face the flexible electrode 10 and are inclined with respect to the flexible electrode 10. The inclined faces 42a, 42b are inclined with respect to the fifth face 15. The inclined face 42a and the inclined face 42b are inclined in the directions different from each other.

The third insulating layers 43a, 43b are layers that insulate the third base electrode 40 from the flexible electrode 10. The third insulating layer 43a coats the inclined face 42a of the electrode portion 45a that is one of the electrode portions forming the third base electrode 40. The third insulating layer 43b coats the inclined face 42b of the electrode portion 45b that is the other one of the electrode portions forming the third base electrode 40. In the same manner as the first insulating layers 23a, 23b, the third insulating layers 43a, 43b are formed by using a ferroelectric material including ceramics. A third space 44 is formed between the third insulating layers 43a, 43b and the flexible electrode 10, in which the flexible electrode 10 deforms toward the third insulating layers 43a, 43b by the voltage applied across the third base electrode 40 and the flexible electrode 10. In the present embodiment, the third space 44 is formed between the third insulating layers 43a, 43b provided on the opposite face 41 of the third base electrode 40 facing the flexible electrode 10 and the fifth face 15 of the flexible electrode 10.

The output members 50 to 70 are adapted to output work to the outside of the actuator 1. The output members 50 to 70 are driven members attached to the flexible electrode 10 and adapted to be displaced according to the deformation of the flexible electrode 10. It should be noted that the configuration of the output members 50 to 70 is not limited to the one illustrated in FIG. 2 below, but may be appropriately designed according to, for example, the environment of use of the actuator 1 including the specification of an external device that receives the work of the actuator 1.

The output members 50 to 70 include the first output member 50, the second output member 60, and the third output member 70.

The first output member 50 is a driven member adapted to be displaced according to the deformation of the flexible electrode 10 mainly along the Y-axis. In the present embodiment, the first output member 50 is attached to the second face 12 of the flexible electrode 10. The first output member 50 may be formed by an output end 51 having a high rigidity coupled to the external device, a beam portion 52 having a high rigidity adapted to support the output end 51, and a coupling portion 53 adapted to couple the beam portion 52 to the flexible electrode 10.

The beam portion 52 is formed into a cross along a pair of diagonal lines of the square second face 12 and is disposed with a predetermined distance from the second face 12 in the +Y-axis direction. The output end 51 is formed in a rod shape so as to protrude in the +Y-axis direction from the intersection point of the cross-shaped beam portion 52. The coupling portion 53 includes a horizontal portion 54, which extends from each of the ends of the beam portion 52 in the axial direction of the beam portion 52, and a vertical portion 55, which extends from each of the vertexes of the second face 12 in the vertical direction (+Y-axis direction) of the second face 12 and is orthogonal to the horizontal portion 54. The horizontal portion 54 may be formed by a member such as a damper that can be extended and retracted only in the axial direction of the horizontal portion 54. The vertical portion 55 may be formed by an elastic member such as a spring that can elastically deform in a direction crossing the axial direction of the vertical portion 55. A node 56 between the horizontal portion 54 and the vertical portion 55 may be a hinged node, rotation of which is not restricted, and may be formed by a ball joint, for example. A node 57 between the vertical portion 55 and the flexible electrode 10 may be a rigid node, rotation of which is restricted.

The second output member 60 is a driven member adapted to be displaced according to the deformation of the flexible electrode 10 mainly along the X-axis. In the present embodiment, the second output member 60 is attached to the fourth face 14 of the flexible electrode 10. The second output member 60 is formed in the same manner as the first output member 50. That is, the second output member 60 may be formed by an output end 61 coupled to the external device, a beam portion 62 adapted to support the output end 61, and a coupling portion 63 adapted to couple the beam portion 62 to the flexible electrode 10. The detailed configurations of the output end 61, the beam portion 62, and the coupling portion 63 of the second output member 60 are equal to those of the output end 51, the beam portion 52, and the coupling portion 53 of the first output member 50, respectively. That is, the coupling portion 63 includes a horizontal portion 64, which extends from each of the ends of the cross-shaped beam portion 62 in the axial direction of the beam portion 62, and a vertical portion 65, which extends from each of the vertexes of the fourth face 14 in the vertical direction (+X-axis direction) of the fourth face 14 and is orthogonal to the horizontal portion 64. A node 66 between the horizontal portion 64 and the vertical portion 65 may be a hinged node, rotation of which is not restricted, and a node 67 between the vertical portion 65 and the flexible electrode 10 may be a rigid node, rotation of which is restricted.

The third output member 70 is a driven member adapted to be displaced according to the deformation of the flexible electrode 10 mainly along the Z-axis. In the present embodiment, the third output member 70 is attached to the sixth face 16 of the flexible electrode 10. The third output member 70 is formed in the same manner as the first output member 50. That is, the third output member 70 may be formed by an output end 71 coupled to the external device, a beam portion 72 adapted to support the output end 71, and a coupling portion 73 adapted to couple the beam portion 72 to the flexible electrode 10. The detailed configurations of the output end 71, the beam portion 72, and the coupling portion 73 of the third output member 70 are equal to those of the output end 51, the beam portion 52, and the coupling portion 53 of the first output member 50, respectively. That is, the coupling portion 73 includes a horizontal portion 74, which extends from each of the ends of the cross-shaped beam portion 72 in the axial direction of the beam portion 72, and a vertical portion 75, which extends from each of the vertexes of the sixth face 16 in the vertical direction (+Z-axis direction) of the sixth face 16 and is orthogonal to the horizontal portion 74. A node 76 between the horizontal portion 74 and the vertical portion 75 may be a hinged node, rotation of which is not restricted, and a node 77 between the vertical portion 75 and the flexible electrode 10 may be a rigid node, rotation of which is restricted.

Figure 3:
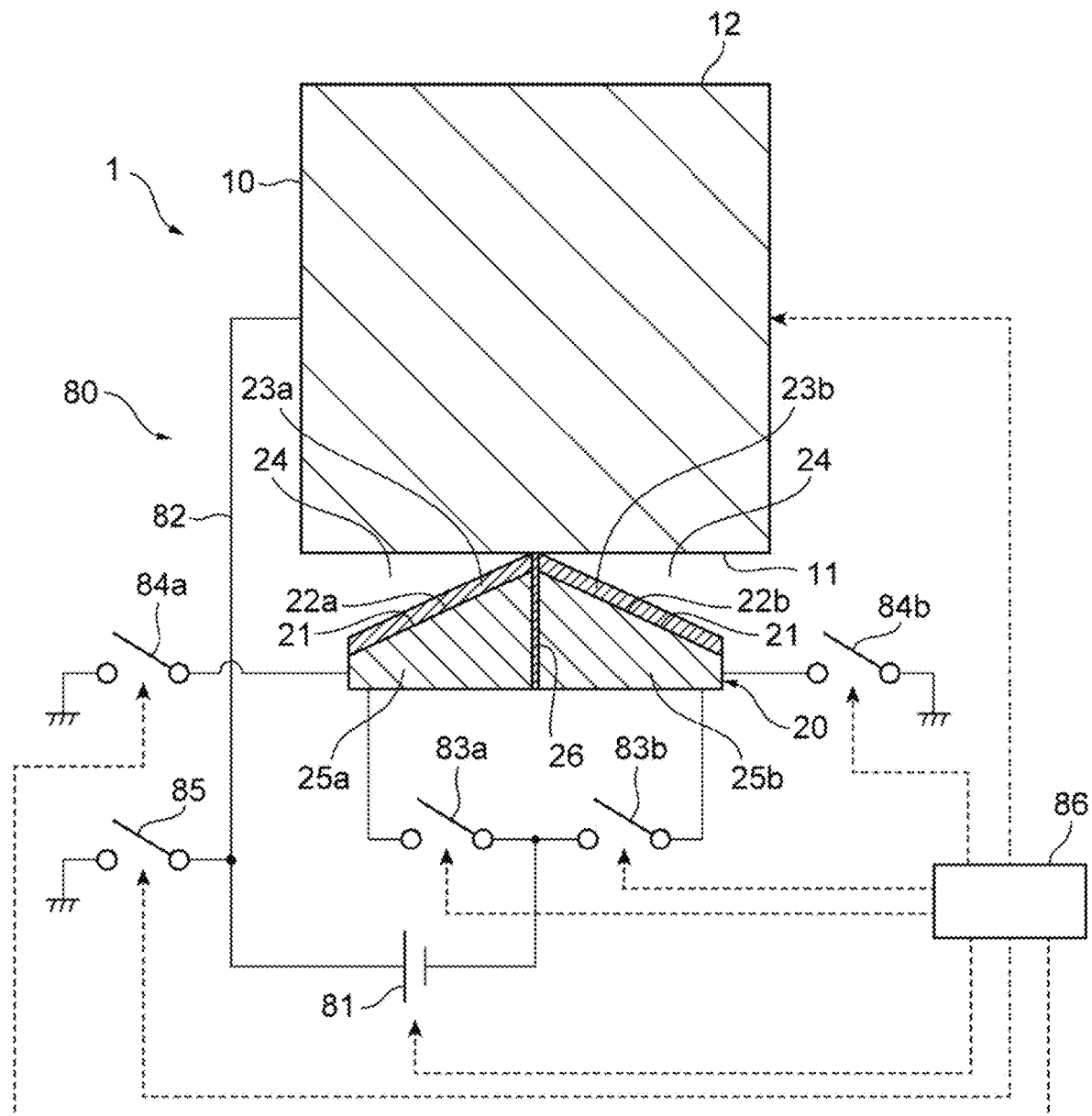
FIG. 3 is a view explaining a drive circuit of the actuator illustrated in FIG. 1.

FIG. 3 is a view explaining a drive circuit 80 of the actuator 1 illustrated in FIG. 1. It should be noted that the illustration of the second base electrode 30, the third base electrode 40, and the output members 50 to 70 is omitted in FIG. 3. FIG. 3 schematically illustrates the cross section in XY plane of the flexible electrode 10 and the first base electrode 20 illustrated in FIG. 1.

The drive circuit 80 is an electric circuit for driving the actuator 1. The drive circuit 80 is adapted to drive the actuator 1 by applying a voltage across the base electrodes 20 to 40 and the flexible electrode 10. FIG. 3 illustrates only the drive circuit 80 adapted to apply a voltage across the first base electrode 20 and the flexible electrode 10. The drive circuit 80 adapted to apply a voltage across the second base electrode 30 or the third base electrode 40 and the flexible electrode 10 is configured in the same manner as the drive circuit 80 adapted to apply a voltage across the first base electrode 20 and the flexible electrode 10. Thus, the descriptions thereof will be omitted.

The drive circuit 80 includes a power supply 81 formed by a direct voltage source, for example, a wire 82 adapted to couple the elements of the drive circuit 80 and the actuator 1, switches 83a, 83b, 84a, 84b, 85 formed by semiconductor elements, for example, and a control unit 86 formed by an integrated circuit, for example.

One of the positive terminal and the negative terminal of the power supply 81 is coupled to the flexible electrode 10 by the wire 82, and the other one of the positive terminal and the negative terminal of the power supply 81 is coupled to the first base electrode 20 by the wire 82. The other one of the positive terminal and the negative terminal of the power supply 81 is coupled to the electrode portion 25a and the electrode portion 25b forming the first base electrode 20 that are in parallel to each other. The switch 83a is coupled between the electrode portion 25a and the power supply 81. The switch 83b is coupled between the electrode portion 25b and the power supply 81. The switch 84a is coupled between the electrode portion 25a and the frame ground (or earth). The switch 84b is coupled between the electrode portion 25b and the frame ground (or earth). The switch 85 is coupled between the flexible electrode 10 and the frame ground (or earth). That is, the electrode portions 25a, 25b and the flexible electrode 10 are coupled to the frame ground (or earth) via the switches 84a, 84b, 85, respectively. It should be noted that the power supply 81 may be provided for each of the electrode portion 25a and the electrode portion 25b individually.

The control unit 86 is a circuit for controlling the elements of the drive circuit 80. The control unit 86 is adapted to control the switches 83a, 83b, 84a, 84b, 85 so as to apply a voltage or stop application of the voltage across each of the electrode portions 25a, 25b and the flexible electrode 10. The control unit 86 is adapted to independently control the ON/OFF state of the switch 83a and the ON/OFF state of the switch 83b. The control unit 86 is adapted to independently control the ON/OFF state of the switch 84a, the ON/OFF state of the switch 84b, and the ON/OFF state of the switch 85. For example, when the switch 83a is controlled to be in the ON state, the power supply 81 and the electrode portion 25a become conducting, and in addition, when the switches 84a, 85 are controlled to be in the OFF state, a voltage is applied across the electrode portion 25a and the flexible electrode 10. When the switch 83a is controlled to be in the OFF state, the power supply 81 and the electrode portion 25a become nonconducting, and the application of the voltage across the electrode portion 25a and the flexible electrode 10 is stopped. In the same manner, the application of the voltage across the electrode portion 25b and the flexible electrode 10 is controlled when the control unit 86 controls the ON/OFF state of each of the switches 83b, 84b, 85.

Furthermore, the control unit 86 is adapted to control the output voltage of the power supply 81 so as to control the magnitude of a voltage to be applied across each of the electrode portions 25a, 25b and the flexible electrode 10. This allows the control unit 86 to control the magnitude of the Coulomb force acting on the flexible electrode 10 and control the deformation amount of the flexible electrode 10, thus controlling the displacement amount of the first output member 50. When the power supply 81 is provided individually for the electrode portion 25a and the electrode portion 25b, for example, the control unit 86 may independently control the magnitude of the voltage to be applied across the electrode portion 25a and the flexible electrode 10 and the magnitude of the voltage to be applied across the electrode portion 25b and the flexible electrode 10. This allows the control unit 86 to partially divide and control the deformation amount of the flexible electrode 10, thus controlling the displacement amount of the first output member 50 in a complicated and fine manner.

Figure 4:
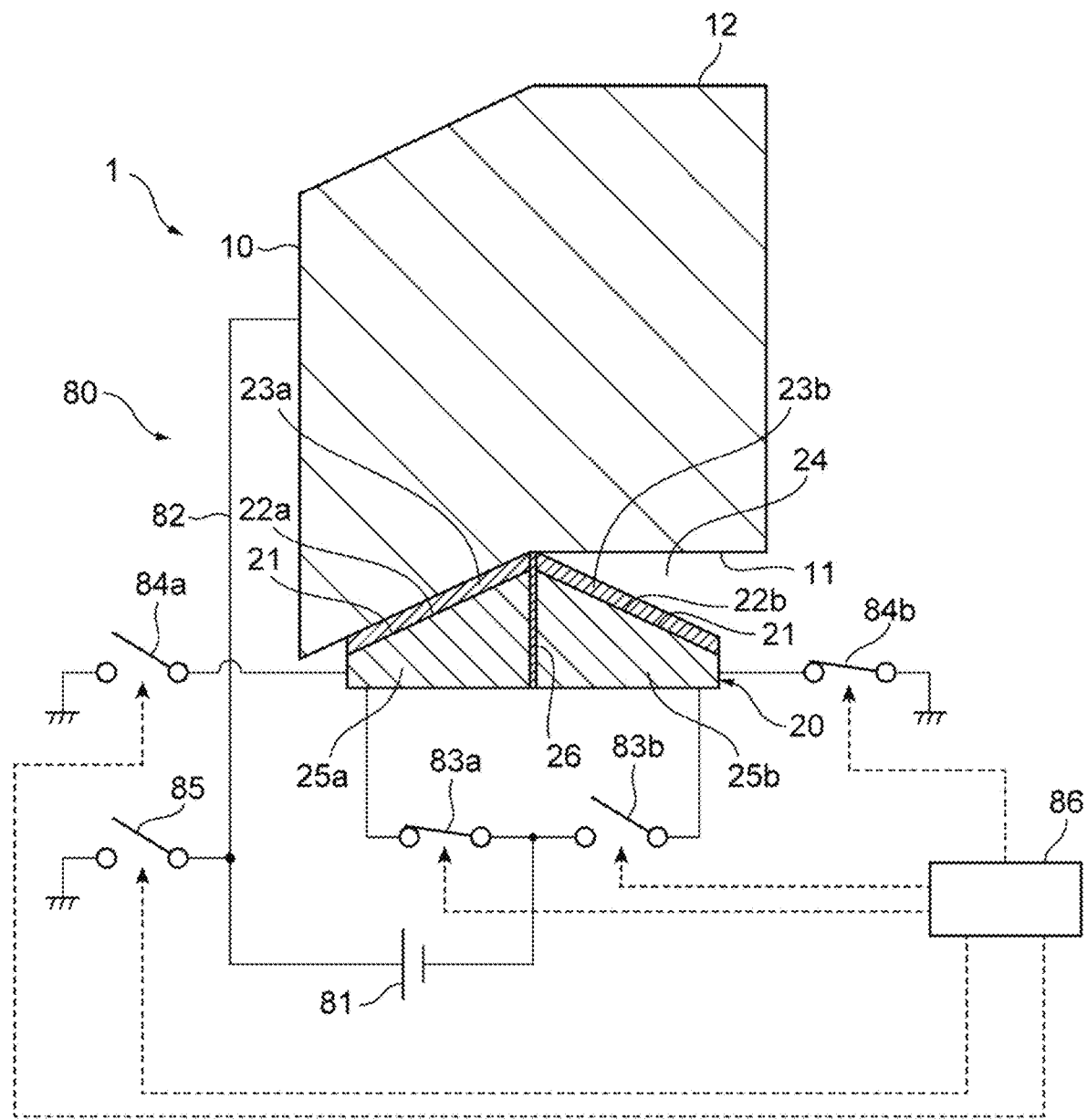
FIG. 4 is a view explaining an aspect of deformation of a flexible electrode when a voltage is applied across one of electrode portions forming a first base electrode and the flexible electrode illustrated in FIG. 3.

FIG. 4 is a view explaining an aspect of deformation of the flexible electrode 10 when a voltage is applied across the electrode portion 25a, which is one of the electrode portions forming the first base electrode 20, and the flexible electrode 10 illustrated in FIG. 3.

As illustrated in FIG. 4, when the switches 83a, 84b are controlled to be in the ON state and the switches 83b, 84a, 85 are controlled to be in the ON state, a voltage is applied only across the electrode portion 25a forming the first base electrode 20 and the flexible electrode 10 in the actuator 1. In this case, the flexible electrode 10 coupled to the positive terminal of the power supply 81 is positively charged, and the electrode portion 25a coupled to the negative terminal of the power supply 81 is negatively charged. The first insulating layer 23a coating the inclined face 22a of the electrode portion 25a is polarized. The vicinity of the interface between the first insulating layer 23a and the electrode portion 25a is positively charged, and the vicinity of the surface opposite to the interface (on the first space 24 side) is negatively charged. A Coulomb force is generated between the first insulating layer 23a and the flexible electrode 10. The Coulomb force causes the flexible electrode 10 to be attracted by the first insulating layer 23a. In the flexible electrode 10, the portion of the first face 11 facing the first insulating layer 23a (in the −X-axis direction) deforms toward the first insulating layer 23a so as to adhere to the first insulating layer 23a. Since the first insulating layer 23a is inclined along the inclined face 22a, the first output member 50 coupled to the second face 12 of the flexible electrode 10 is displaced in the −Y-axis direction and the −X-axis direction. That is, the first base electrode 20 can cause the first output member 50 to rotate counterclockwise in the roll direction as viewed in the +Z-axis direction when a voltage is applied only across the electrode portion 25a and the flexible electrode 10. It should be noted that when no electric charge is stored in the electrode portion 25b as in the startup of the actuator 1, for example, the switch 84b in the example illustrated in FIG. 4 may be controlled to be in the OFF state.

Figure 5:
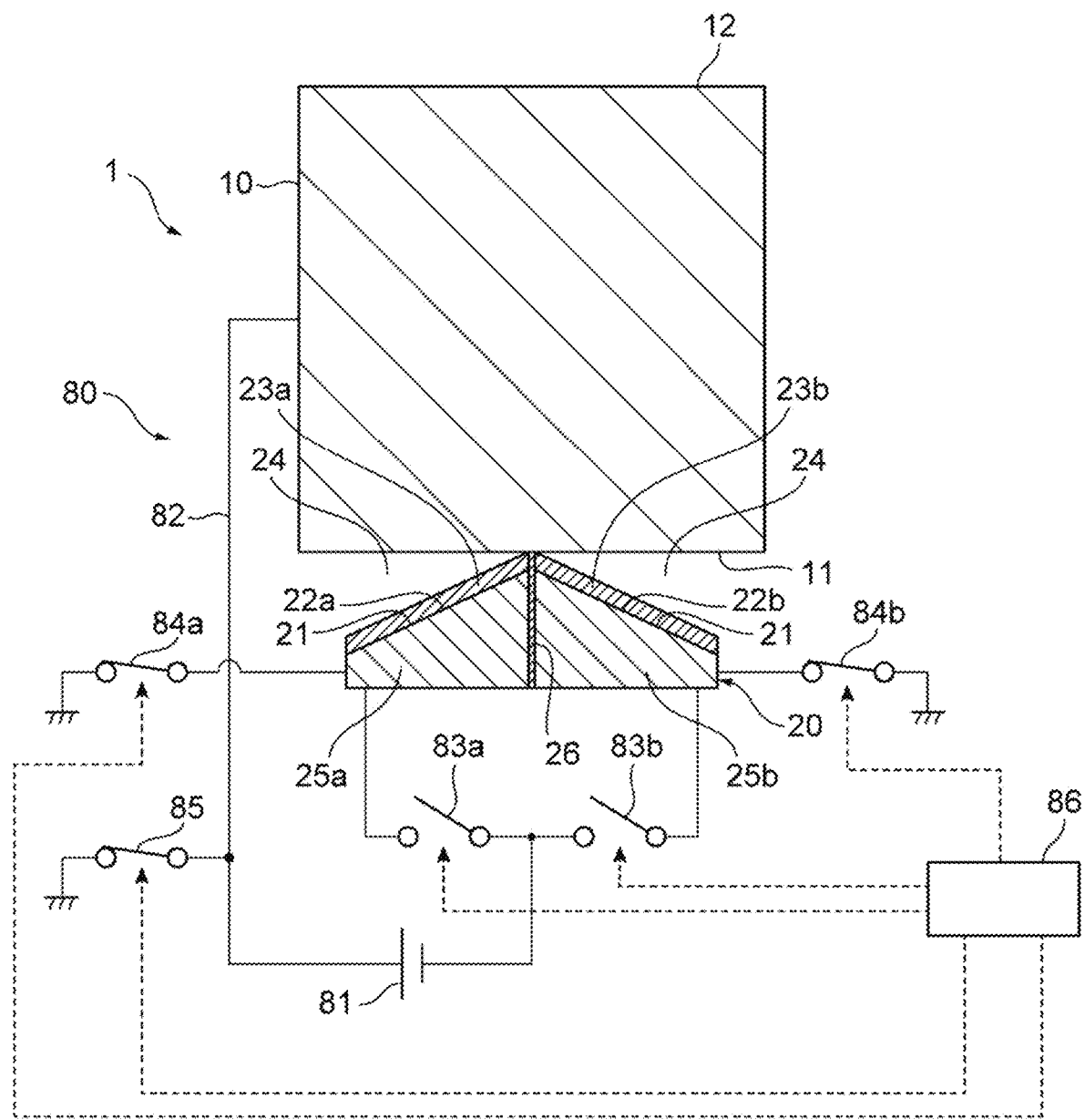
FIG. 5 is a view explaining an aspect of deformation of the flexible electrode when the application of the voltage is stopped after the state illustrated in FIG. 4.

FIG. 5 is a view explaining an aspect of deformation of the flexible electrode 10 when the application of the voltage is stopped after the state illustrated in FIG. 4.

After the state illustrated in FIG. 4, when the switches 83a, 83b are controlled to be in the OFF state, and the switches 84a, 84b, 85 are controlled to be in the ON state as illustrated in FIG. 5, the application of a voltage across the electrode portion 25a, which is one of the electrode portions forming the first base electrode 20, and the flexible electrode 10 is stopped. In this case, the electric charge stored in the electrode portion 25a and the flexible electrode 10, to which a voltage has been applied, is released to the frame ground, for example. In the flexible electrode 10, the portion of the first face 11 facing the first insulating layer 23a (in the −X-axis direction), adhering to the first insulating layer 23a, deforms so as to separate from the first insulating layer 23a and returns to the original shape. The first output member 50 coupled to the second face 12 of the flexible electrode 10 returns to the position in the initial state.

Figure 6:
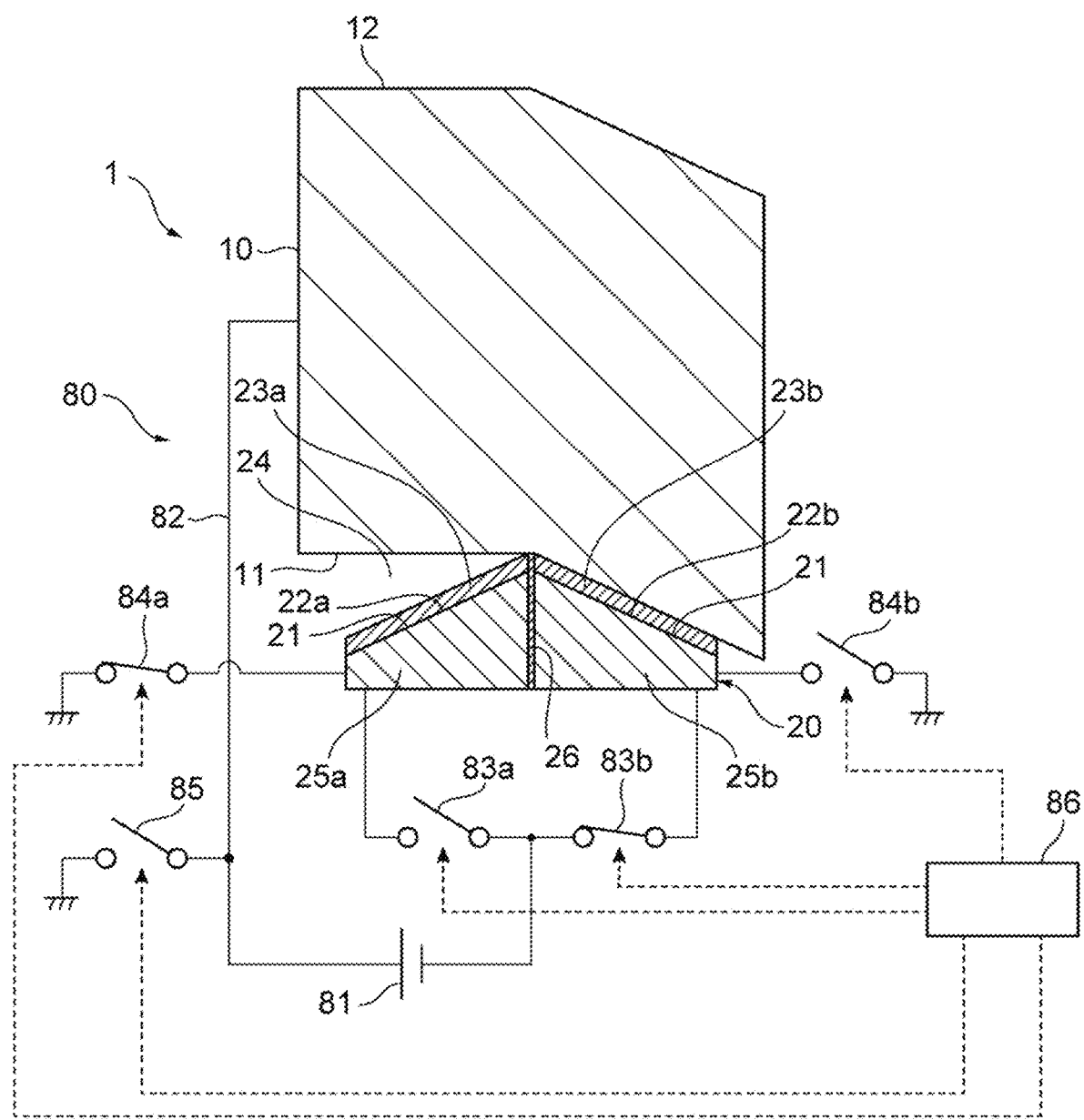
FIG. 6 is a view explaining an aspect of deformation of the flexible electrode when a voltage is applied across the other one of the electrode portions forming the first base electrode and the flexible electrode illustrated in FIG. 3.

FIG. 6 is a view explaining an aspect of deformation of the flexible electrode 10 when a voltage is applied across the electrode portion 25b, which is the other one of the electrode portions forming the first base electrode 20, and the flexible electrode 10 illustrated in FIG. 3.

When the switches 83b, 84a are controlled to be in the ON state and the switches 83a, 84b, 85 are controlled to be in the OFF state as illustrated in FIG. 6, a voltage is applied only across the electrode portion 25b forming the first base electrode 20 and the flexible electrode 10 in the actuator 1. In this case, in the same manner as in FIG. 4, in the flexible electrode 10, the portion of the first face 11 facing the first insulating layer 23b (in the +X-axis direction) deforms toward the first insulating layer 23b so as to adhere to the first insulating layer 23b. Since the first insulating layer 23b is inclined along the inclined face 22b, the first output member 50 coupled to the second face 12 of the flexible electrode 10 is displaced in the −Y-axis direction and the +X-axis direction. That is, the first base electrode 20 can cause the first output member 50 to rotate clockwise in the roll direction as viewed in the +Z-axis direction when a voltage is applied only across the electrode portion 25b and the flexible electrode 10. It should be noted that when no electric charge is stored in the electrode portion 25a as in the startup of the actuator 1, for example, the switch 84a in the example illustrated in FIG. 6 may be controlled to be in the OFF state.

The control unit 86 can control the ON/OFF state of each of the switches 83a, 83b, 84a, 84b, 85 to be in the state of FIG. 4, the state of FIG. 5, and then the state of FIG. 6 in this order, or after the state of FIG. 6, to be in the state of FIG. 5, and then the state of FIG. 4 in this order. The state of the first base electrode 20 is alternately switched between the state where a voltage is applied only across the electrode portion 25a and the flexible electrode 10 and the state where a voltage is applied only across the electrode portion 25b and the flexible electrode 10, with interposed therebetween, the state where the application of the voltage is stopped. The flexible electrode 10 is alternately switched between the aspect in which the flexible electrode 10 deforms toward the first insulating layer 23a illustrated in FIG. 4 and the aspect in which the flexible electrode 10 deforms toward the first insulating layer 23b illustrated in FIG. 6, with interposed therebetween, the state where the flexible electrode 10 has returned to the original shape illustrated in FIG. 5. That is, the deformation direction of the flexible electrode 10 may be alternately switched by the first base electrode 20 between the direction toward the first insulating layer 23a along the inclined face 22a and the direction toward the first insulating layer 23b along the inclined face 22b. Accordingly, the first base electrode 20 can cause the first output member 50 to swing in the direction rotating about the Z-axis.

Figure 7:
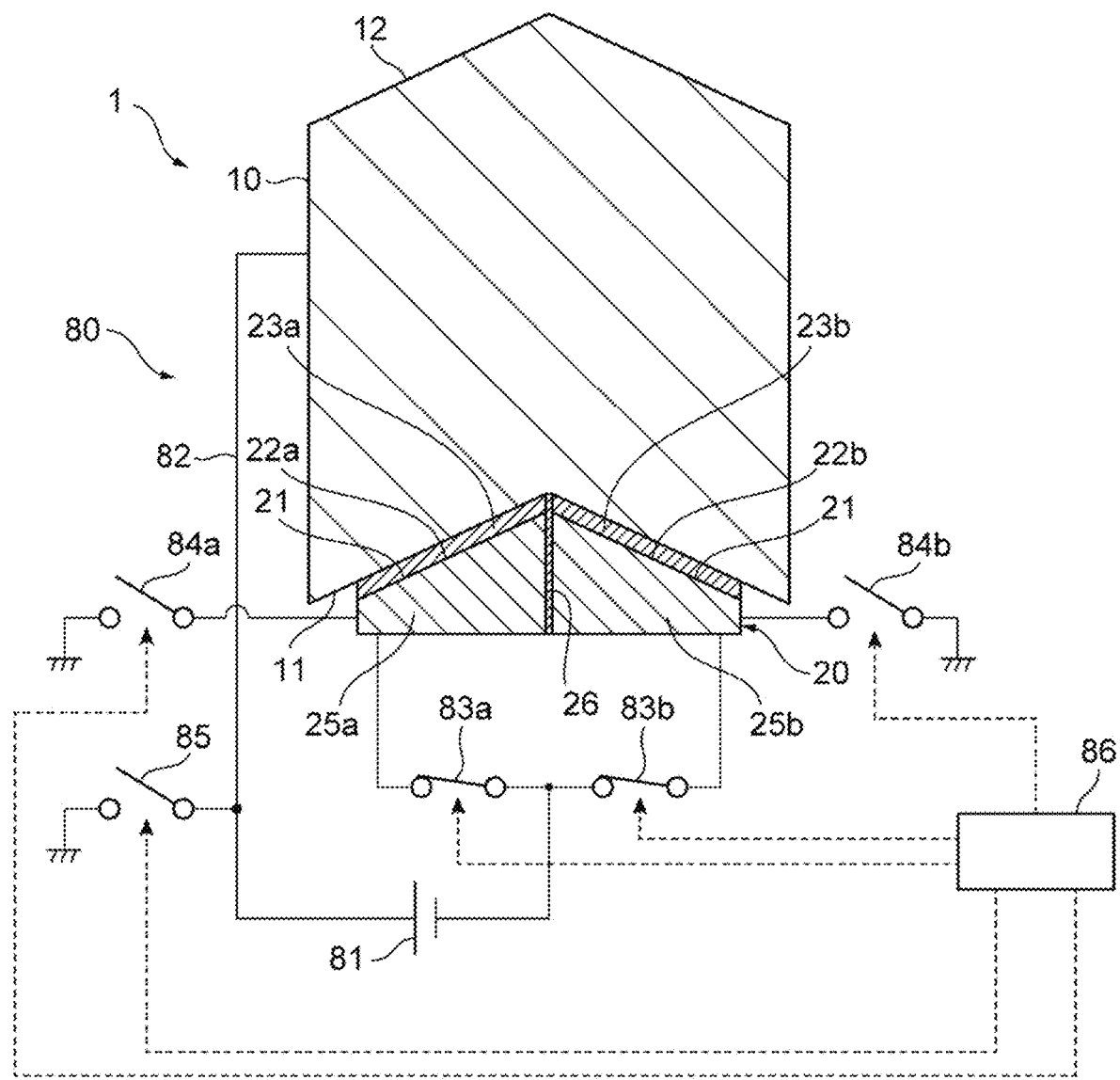
FIG. 7 is a view explaining an aspect of deformation of the flexible electrode when a voltage is applied across both of the electrode portions forming the first base electrode and the flexible electrode illustrated in FIG. 3.

FIG. 7 is a view explaining an aspect of deformation of the flexible electrode 10 when a voltage is applied across both of the electrode portions 25a, 25b forming the first base electrode 20 and the flexible electrode 10 illustrated in FIG. 3.

When both of the switch 83a and the switch 83b are controlled to be in the ON state and the switches 84a, 84b, 85 are controlled to be in the OFF state as illustrated in FIG. 7, a voltage is applied across the electrode portion 25a of the first base electrode 20 and the flexible electrode 10 as well as across the electrode portion 25b of the first base electrode 20 and the flexible electrode 10 in the actuator 1. At this time, a voltage applied across the electrode portion 25a and the flexible electrode 10 is equal to that applied across the electrode portion 25b and the flexible electrode 10. In this case, in the flexible electrode 10, approximately all of the portions of the first face 11 deform toward the first insulating layers 23a, 23b so as to adhere to the first insulating layers 23a, 23b. Since the first insulating layers 23a, 23b are inclined along the inclined faces 22a, 22b, the first output member 50 coupled to the second face 12 of the flexible electrode 10 is displaced in the −Y-axis direction. That is, the first base electrode 20 can cause the first output member 50 to translationally move along the Y-axis when a voltage is applied across the electrode portion 25a and the flexible electrode 10 as well as across the electrode portion 25b and the flexible electrode 10.

The drive circuit 80 adapted to apply a voltage across the second base electrode 30 and the flexible electrode 10 can also independently control a voltage to be applied across each of the electrode portions 35a, 35b forming the second base electrode 30 and the flexible electrode 10 in the same manner as those illustrated in FIG. 4 to FIG. 7. With such a configuration, the second base electrode 30 can cause the second output member 60 to rotate counterclockwise or clockwise in the yaw direction as viewed in the +Y-axis direction, and to swing in the direction rotating about the Y-axis. Further, the second base electrode 30 can cause the second output member 60 to translationally move along the X-axis.

The drive circuit 80 adapted to apply a voltage across the third base electrode 40 and the flexible electrode 10 can also independently control a voltage to be applied across each of the electrode portions 45a, 45b forming the third base electrode 40 and the flexible electrode 10 in the same manner as those illustrated in FIG. 4 to FIG. 7. With such a configuration, the third base electrode 40 can cause the third output member 70 to rotate counterclockwise or clockwise in the pitch direction as viewed in the +X-axis direction, and to swing in the direction rotating about the X-axis. Further, the third base electrode 40 can cause the third output member 70 to translationally move along the Z-axis.

Figure 8:
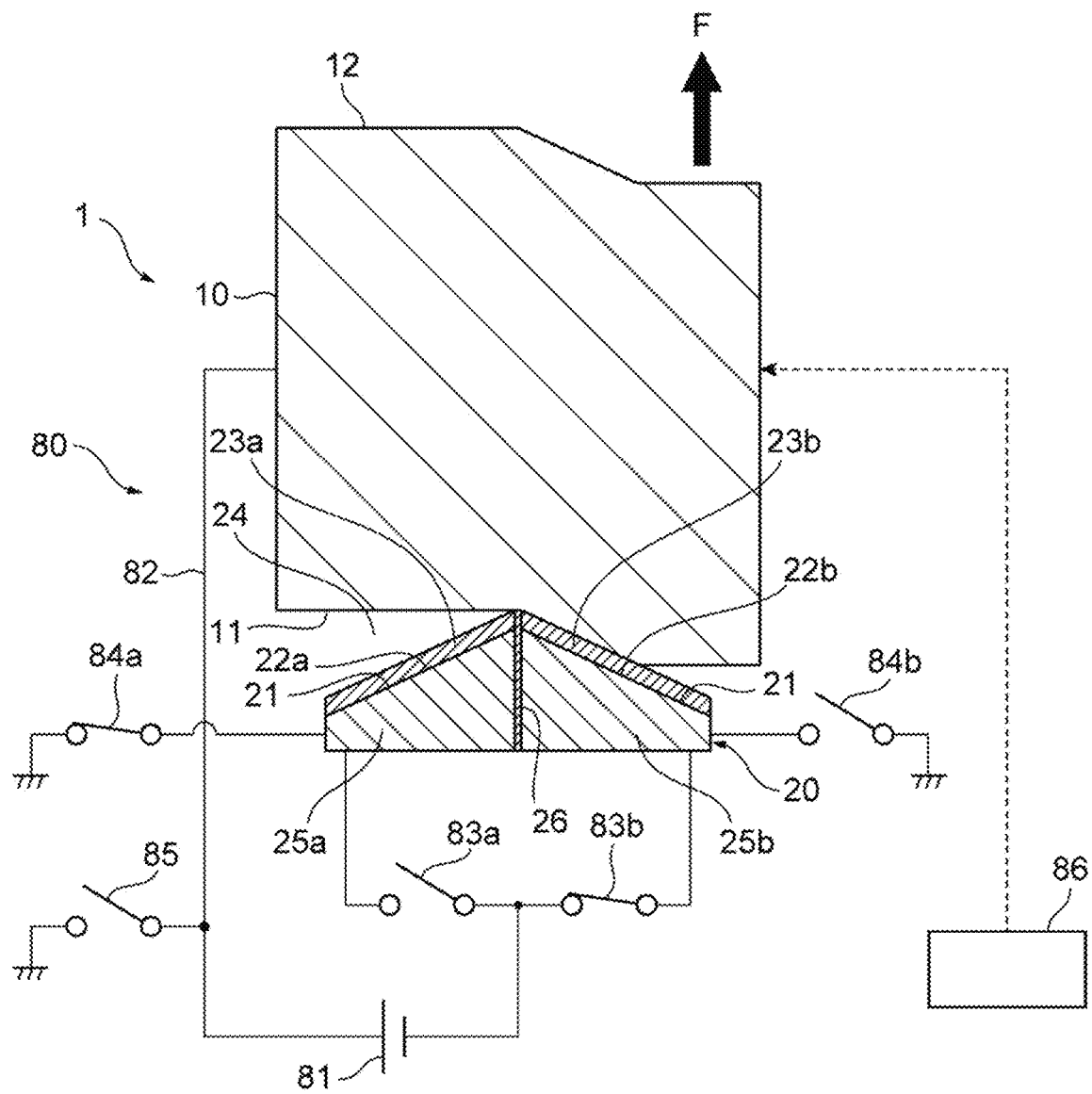
FIG. 8 is a view explaining a principle of detection of a displacement amount of an output member.

FIG. 8 is a view explaining a principle of detection of a displacement amount of the output members 50 to 70. It should be noted that FIG. 8 corresponds to FIG. 6.

In the actuator 1, since the output members 50 to 70 are driven in a state of being coupled to the external device, while driven, the flexible electrode 10 receives an external force F due to the coupling to the external device, and thus is prevented from deforming to adhere to the base electrodes 20 to 40. Meanwhile, it is known that there is a predetermined negative correlation between the distance between the base electrodes 20 to 40 and the flexible electrode 10 and the amount of electric charge stored between the base electrodes 20 to 40 and the flexible electrode 10.

The control unit 86 of the drive circuit 80 can store in advance, as a reference amount of electric charge, the amount of electric charge stored in a state where the output members 50 to 70 are not coupled to the external device and the flexible electrode 10 is adhering to the base electrodes 20 to 40. The control unit 86 can calculate a distance between the flexible electrode 10 that has received the external force F and the base electrodes 20 to 40 by comparing the amount of electric charge stored while the actuator 1 is driven and the reference amount of electric charge. From the result of the calculated distance, the control unit 86 can calculate the deformation amount of the flexible electrode 10. From the deformation amount of the flexible electrode 10, the control unit 86 can not only calculate the displacement amount of the output members 50 to 70, but also calculate the magnitude of the external force F acting on the flexible electrode 10.

As described above, in the actuator 1, the control unit 86 of the drive circuit 80 can detect a displacement amount of each of the output members 50 to 70 by detecting an amount of electric charge stored in the flexible electrode 10. The actuator 1 can detect a displacement amount of each the output members 50 to 70 without newly introducing a detection device separate from the actuator 1 such as a laser displacement gage. By controlling the output voltage of the power supply 81 to match the detected displacement amount with a target displacement amount, the control unit 86 can perform feedback control of the displacement amount of the output members 50 to 70. Therefore, the actuator 1 can control the movement with multiple degrees of freedom with a simple configuration.

It should be noted that in the above descriptions, the actuator 1 includes the base electrodes 20 to 40 disposed to face the flexible electrode 10 on the three axes: X-axis, Y-axis, and Z-axis. However, the actuator 1 of the first embodiment is not limited to this, and may include base electrodes disposed to face the flexible electrode 10 at least on two axes that cross each other. For example, the actuator 1 of the first embodiment may include only the first base electrode 20 on the Y-axis and the second base electrode 30 on the X-axis. In addition, as long as the flexible electrode 10 is formed into a three-dimensional shape, the shape of the flexible electrode 10 may be other than a hexahedron. Further, the flexible electrode 10 may include a portion which will not deform according to the above-mentioned Coulomb force, and such a portion may be restricted by being fixed to an external member.

Figure 10:
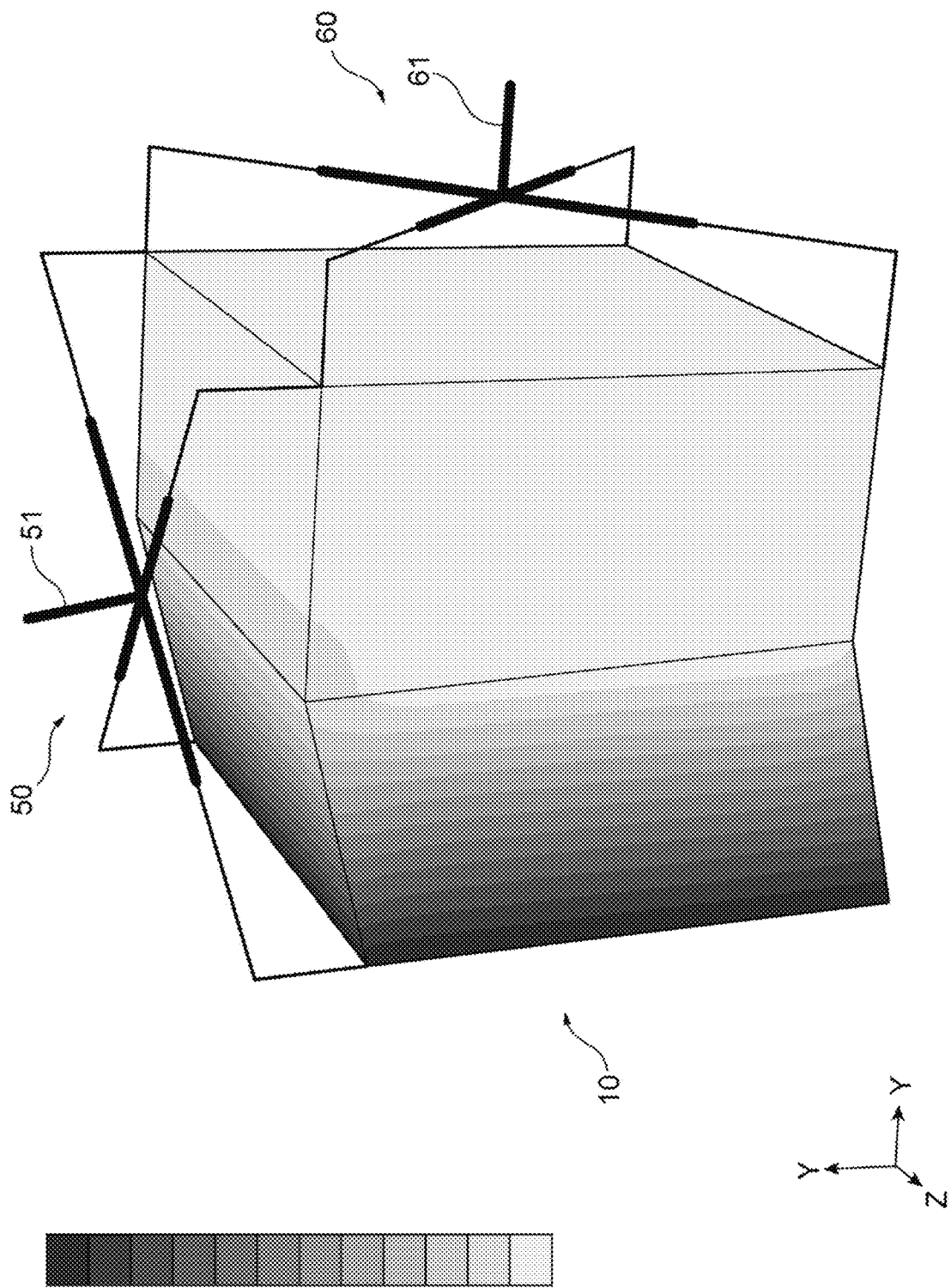
FIG. 10 is a view showing the analysis result of an aspect of deformation of the flexible electrode in a first state illustrated in FIG. 9.
Figure 11:
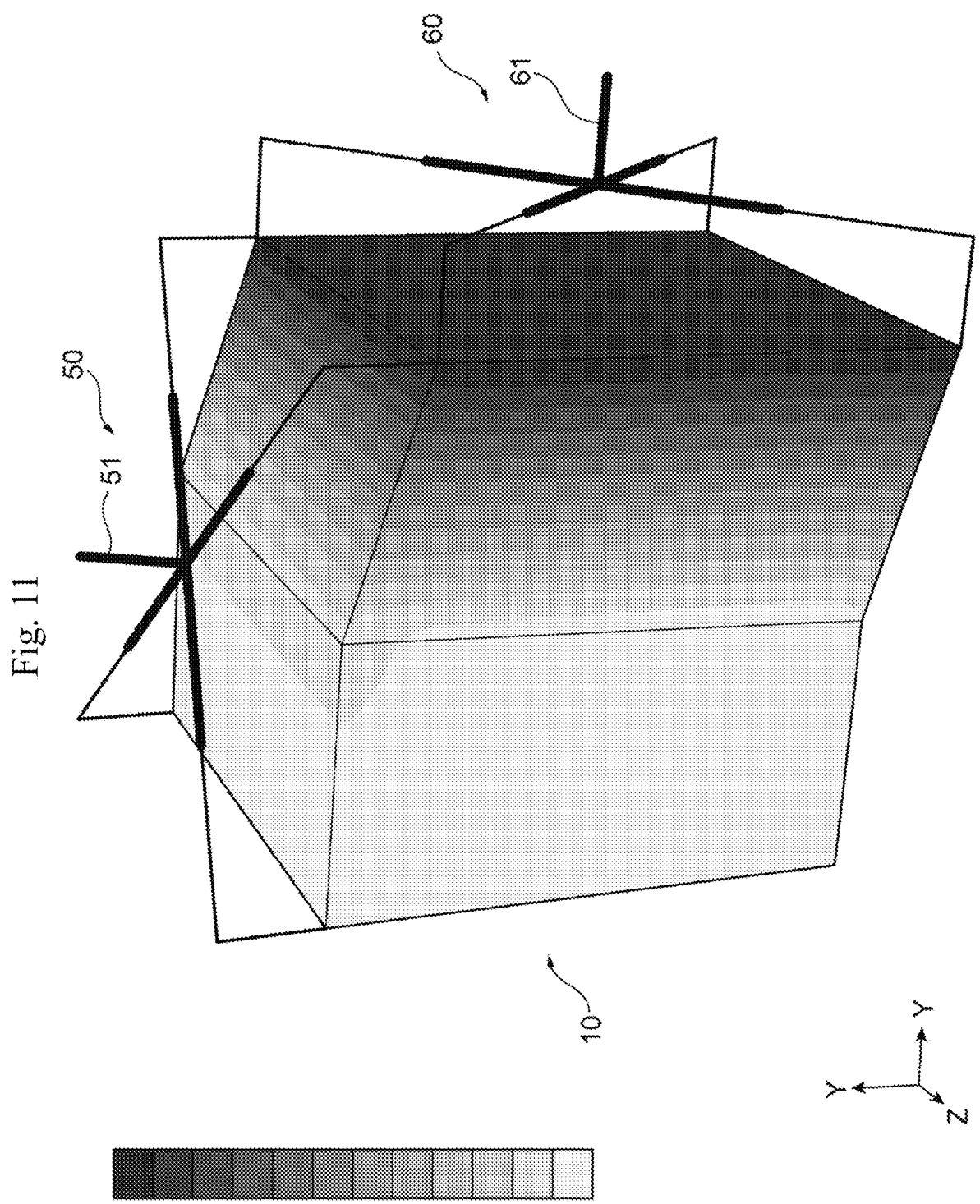
FIG. 11 is a view showing the analysis result of an aspect of deformation of the flexible electrode in a second state illustrated in FIG. 9.
Figure 12:
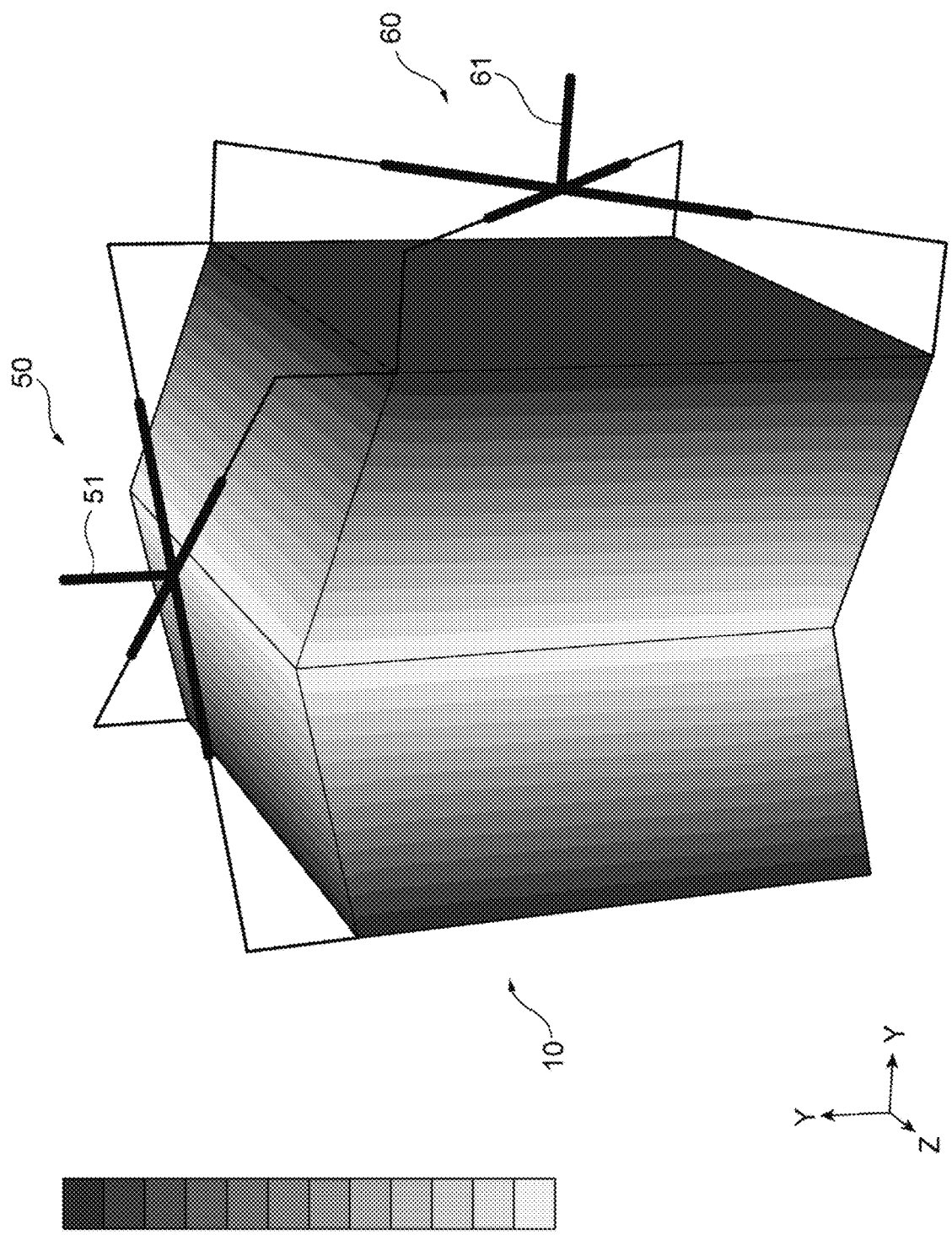
FIG. 12 is a view showing the analysis result of an aspect of deformation of the flexible electrode in a third state illustrated in FIG. 9.
Figure 13:
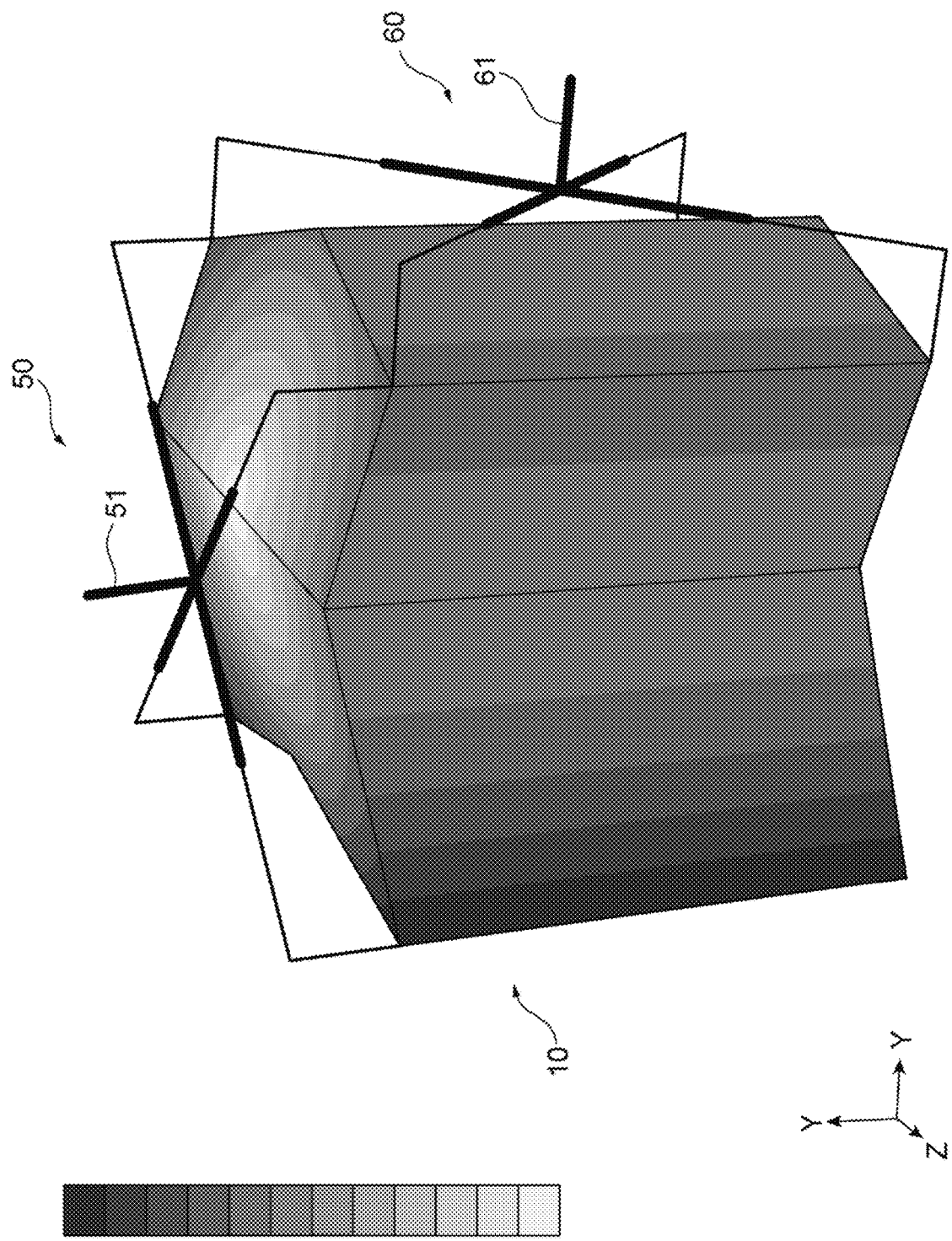
FIG. 13 is a view showing the analysis result of an aspect of deformation of the flexible electrode in an eighth state illustrated in FIG. 9.

FIG. 9 is a table showing the results of simulation analysis performed for the operation of the actuator 1 illustrated in FIG. 1. FIG. 10 is a view showing the analysis result of an aspect of deformation of the flexible electrode 10 in a first state illustrated in FIG. 9. FIG. 11 is a view showing the analysis result of an aspect of deformation of the flexible electrode 10 in a second state illustrated in FIG. 9. FIG. 12 is a view showing the analysis result of an aspect of deformation of the flexible electrode 10 in a third state illustrated in FIG. 9. FIG. 13 is a view showing the analysis result of an aspect of deformation of the flexible electrode 10 in an eighth state illustrated in FIG. 9. It should be noted that in FIG. 10 to FIG. 13, a portion having a high level of gray scale in the flexible electrode 10 indicates that the portion has a large deformation amount (i.e., displacement amount) with reference to the initial state, and a portion having a low level of gray scale in the flexible electrode 10 indicates that the portion has a small deformation amount (i.e., displacement amount) with reference to the initial state.

The analysis used a model in which the third base electrode 40 and the third output member 70 are omitted from the actuator 1 illustrated in FIG. 1 and FIG. 2. As analysis conditions, the output end 51 and the beam portion 52 of the first output member 50 each had a Young's modulus of 200 GPa. In the horizontal portion 54 of the coupling portion 53 of the first output member 50, displacement of the horizontal portion 54 in the axial direction was allowed, whereas displacement and rotation of the horizontal portion 54 in a direction other than the axial direction were restricted. In the vertical portion 55 of the coupling portion 53 of the first output member 50, relative displacement between the node 56 and the node 57 located on the opposite ends of the vertical portion 55 was restricted, rotation of the node 56 was allowed, and rotation of the node 57 was restricted. The magnitude of a voltage to be applied across one of the plurality of electrode portions 25a, 25b forming the first base electrode 20 and the flexible electrode 10 was equal to the magnitude of a voltage to be applied across the other one of the plurality of electrode portions 25a, 25b forming the first base electrode 20 and the flexible electrode 10. The same analysis conditions were employed for the second output member 60.

Then, a displacement amount of each of the first output member 50 and the second output member 60 in the first state to the eighth state illustrated in FIG. 9 was obtained, in which the application of a voltage across each of the plurality of electrode portions 25a, 25b and the flexible electrode 10 and the application of a voltage across each of the plurality of electrode portions 35a, 35b and the flexible electrode 10 were changed from the initial state. In the initial state, a voltage is not applied across each of the plurality of electrode portions 25a, 25b and the flexible electrode 10 or across each of the plurality of electrode portions 35a, 35b and the flexible electrode 10.

In the item "Voltage application" in FIG. 9, the sign "o" shows that a voltage is applied, and the sign "x" shows that a voltage is not applied. In the item "Displacement amount" in FIG. 9, the items "X", "Y" and "Z" of "First output member 50" show how much the output end 51 of the first output member 50 is displaced along the X-axis, the Y-axis, and the Z-axis from the initial state, respectively. The items "X", "Y" and "Z" of "Second output member 60" show how much the output end 61 of the second output member 60 is displaced along the X-axis, the Y-axis, and the Z-axis from the initial state, respectively. In the item "Displacement amount," a positive displacement amount shows that the output member is displaced in the plus direction of each axis, and a negative displacement amount shows that the output member is displaced in the minus direction of each axis.

As illustrated in FIG. 9, the first state shows that a voltage is applied only across the electrode portion 25a and the flexible electrode 10. In this case, the output end 51 of the first output member 50 is displaced by 1.39 in the −X-axis direction and by 3.60 in the −Y-axis direction from the initial state, and is not displaced in the ±Z-axis directions. The output end 61 of the second output member 60 is displaced in none of the ±X-axis directions, ±Y-axis directions, and ±Z-axis directions from the initial state. FIG. 10 illustrates an aspect of deformation of the flexible electrode 10 in the first state. In view of these analysis results, it is found that the actuator 1 can cause the first output member 50 to rotate counterclockwise in the roll direction as viewed in the +Z-axis direction when a voltage is applied only across the electrode portion 25a and the flexible electrode 10, as explained with reference to FIG. 4.

As illustrated in FIG. 9, the second state shows that a voltage is applied only across the electrode portion 25b and the flexible electrode 10. In this case, the output end 51 of the first output member 50 is displaced by 1.39 in the +X-axis direction and by 3.60 in the −Y-axis direction from the initial state, and is not displaced in the ±Z-axis directions. The output end 61 of the second output member 60 is displaced by 7.00 in the −Y-axis direction from the initial state and is not displaced in the ±X-axis directions or +Z-axis directions. FIG. 11 illustrates an aspect of deformation of the flexible electrode 10 in the second state. In view of these analysis results, it is found that the actuator 1 can cause the first output member 50 to rotate clockwise in the roll direction as viewed in the +Z-axis direction when a voltage is applied only across the electrode portion 25b and the flexible electrode 10, as explained with reference to FIG. 6.

As illustrated in FIG. 9, the third state shows that a voltage is applied across each of the electrode portions 25a, 25b and the flexible electrode 10 and a voltage is not applied across each of the electrode portions 35a, 35b and the flexible electrode 10. In this case, the output end 51 of the first output member 50 is displaced by 3.60 in the −Y-axis direction from the initial state, and is not displaced in the ±X-axis directions or ±Z-axis directions. The output end 61 of the second output member 60 is displaced by 3.60 in the −Y-axis direction from the initial state, and is not displaced in the +X-axis directions or +Z-axis directions. FIG. 12 illustrates an aspect of deformation of the flexible electrode 10 in the third state. In view of these analysis results, it is found that the actuator 1 can cause the first output member 50 to translationally move along the Y-axis when a voltage is applied across each of the electrode portions 25a, 25b and the flexible electrode 10, as explained with reference to FIG. 7.

As illustrated in FIG. 9, the eighth state shows that a voltage is applied across each of the electrode portions 25a, 25b and the flexible electrode 10 and across each of the electrode portions 35a, 35b and the flexible electrode 10. In this case, the output end 51 of the first output member 50 is displaced by 7.80 in the −X-axis direction and by 7.00 in the −Y-axis direction from the initial state, and is not displaced in the ±Z-axis directions. The output end 61 of the second output member 60 is displaced by 7.00 in the −X-axis direction and by 5.00 in the −Y-axis direction from the initial state, and is not displaced in the ±Z-axis directions. FIG. 13 illustrates an aspect of deformation of the flexible electrode 10 in the eighth state. In view of these analysis results, it is found that the actuator 1 can cause the first output member 50 and the second output member 60 to be displaced along the X-axis and the Y-axis, respectively, when a voltage is applied across each of the electrode portions 25a, 25b and the flexible electrode 10 and across each of the electrode portions 35a, 35b and the flexible electrode 10, and can achieve complicated movement with multiple degrees of freedom.

As described above, the actuator 1 of the first embodiment includes the flexible electrode 10, which has flexibility, and the first base electrode 20, which is disposed to face the flexible electrode 10 on the Y-axis and is provided with the first insulating layers 23a, 23b on the opposite face 21 facing the flexible electrode 10. The actuator 1 includes the second base electrode 30, which is disposed to face the flexible electrode 10 on the X-axis crossing the Y-axis and is provided with the second insulating layers 33a, 33b on the opposite face 31 facing the flexible electrode 10. The actuator 1 includes the first output member 50 and the second output member 60, which are displaced according to the deformation of the flexible electrode 10 and are adapted to output work to the outside. In the actuator 1, the first space 24 is formed between the first insulating layers 23a, 23b and the flexible electrode 10, in which the flexible electrode 10 deforms toward the first insulating layers 23a, 23b by the voltage applied across the first base electrode 20 and the flexible electrode 10. In the actuator 1, the second space 34 is formed between the second insulating layers 33a, 33b and the flexible electrode 10, in which the flexible electrode 10 deforms toward the second insulating layers 33a, 33b by the voltage applied across the second base electrode 30 and the flexible electrode 10.

With such a configuration, the actuator 1 of the first embodiment can cause dielectric polarization of the first insulating layers 23*a*, 23*b* provided in the first base electrode 20 by the voltage applied across the first base electrode 20 and the flexible electrode 10 and generate a Coulomb force between the first insulating layers 23*a*, 23*b* and the flexible electrode 10. The actuator 1 can cause the flexible electrode 10 to deform along the Y-axis by using the effect of the Coulomb force generated between the first insulating layers 23*a*, 23*b* and the flexible electrode 10. In the same manner, the actuator 1 can cause dielectric polarization of the second insulating layers 33*a*, 33*b* provided in the second base electrode 30 by the voltage applied across the second base electrode 30 and the flexible electrode 10 and generate a Coulomb force between the second insulating layers 33*a*, 33*b* and the flexible electrode 10. The actuator 1 can cause the flexible electrode 10 to deform along the X-axis by using the effect of the Coulomb force generated between the second insulating layers 33*a*, 33*b* and the flexible electrode 10. The actuator 1 can cause the first output member 50 and the second output member 60 to be displaced along the X-axis and the Y-axis, respectively, according to the deformation of the flexible electrode 10 along the X-axis and the Y-axis, respectively. Therefore, with only one actuator 1 provided with one flexible electrode 10, the actuator 1 of the first embodiment can easily achieve movement with multiple degrees of freedom, even without combining two or more actuators.

In addition, the actuator 1 of the first embodiment can detect a deformation amount of the flexible electrode 10 and a displacement amount of each of the first output member 50 and the second output member 60 by detecting an amount of electric charge stored in the flexible electrode 10 through an existing method. That is, the actuator 1 can detect a displacement amount of each of the first output member 50 and the second output member 60 without newly introducing a detection device separate from the actuator 1. Therefore, the actuator 1 of the first embodiment can control the movement with multiple degrees of freedom with a simple configuration.

Furthermore, the first base electrode 20 is formed of the plurality of electrode portions 25*a*, 25*b* adapted to independently receive a voltage, and the second base electrode 30 is formed of the plurality of electrode portions 35*a*, 35*b* adapted to independently receive a voltage.

With such a configuration, the first base electrode 20 can control the voltage applied across the first base electrode 20 and the flexible electrode 10 for each of the plurality of electrode portions 25*a*, 25*b*. The first base electrode 20 can control the Coulomb force acting on the flexible electrode 10 for each of the plurality of electrode portions 25*a*, 25*b*. Accordingly, the first base electrode 20 can cause the flexible electrode 10 to deform in a more complicated and fine manner as compared to the first base electrode 20 not including the plurality of electrode portions 25*a*, 25*b*, thus allowing the first output member 50 to be displaced in a complicated and fine manner. Likewise, also when the second base electrode 30 is formed of the plurality of electrode portions 35*a*, 35*b* as described above, the second base electrode 30 can cause the second output member 60 to be displaced in a complicated and fine manner. Therefore, the actuator 1 of the first embodiment can easily achieve complicated and fine movement with multiple degrees of freedom.

Furthermore, the plurality of electrode portions 25*a*, 25*b* respectively has the inclined faces 22*a*, 22*b* that face the flexible electrode 10 and are inclined with respect to the flexible electrode 10. The plurality of electrode portions 35*a*, 35*b* respectively has the inclined faces 32*a*, 32*b* that face the flexible electrode 10 and are inclined with respect to the flexible electrode 10. The inclined faces 22*a*, 22*b* of the plurality of electrode portions 25*a*, 25*b* are inclined in the directions different from each other, and the inclined faces 32*a*, 32*b* of the plurality of electrode portions 35*a*, 35*b* are inclined in the directions different from each other.

With such a configuration, the first base electrode 20 can cause the flexible electrode 10 to deform toward each of the plurality of inclined faces 22*a*, 22*b* that are inclined in the directions different from each other with respect to the flexible electrode 10. Accordingly, the first base electrode 20 can cause the first output member 50 to be displaced so as to rotate in the direction crossing the Y-axis. In particular, by alternately applying a voltage and stopping application of the voltage between the electrode portion 25*a* and the electrode portion 25*b*, which are one and the other one of the plurality of electrode portions 25*a*, 25*b*, the first base electrode 20 can switch the deformation direction of the flexible electrode 10 between the direction toward the inclined face 22*a* of the one electrode portion 25*a* and the direction toward the inclined face 22*b* of the other electrode portion 25*b* alternately. Accordingly, the first base electrode 20 can cause the first output member 50 to be displaced so as to swing in the direction crossing the Y-axis. Likewise, also when the plurality of electrode portions 35*a*, 35*b* forming the second base electrode 30 respectively has the inclined faces 32*a*, 32*b* as described above, the second base electrode 30 can cause the second output member 60 to be displaced so as to rotate or swing in the direction crossing the X-axis. Therefore, the actuator 1 of the first embodiment can easily achieve various types of movement, in addition to the transitional movement along the X-axis or the Y-axis.

Furthermore, the flexible electrode 10 is formed into a hexahedron, which has the first face 11 crossing the Y-axis, the second face 12 facing the first face 11 on the Y-axis, the third face 13 crossing the X-axis, and the fourth face 14 facing the third face 13 on the X-axis. In the first base electrode 20, the opposite face 21 facing the flexible electrode 10 faces the first face 11 of the flexible electrode 10, and the first space 24 is formed between the first insulating layers 23*a*, 23*b* provided on the opposite face 21 of the first base electrode 20 facing the flexible electrode 10 and the first face 11. In the second base electrode 30, the opposite face 31 facing the flexible electrode 10 faces the third face 13 of the flexible electrode 10, and the second space 34 is formed between the second insulating layers 33*a*, 33*b* provided on the opposite face 31 of the second base electrode 30 facing the flexible electrode 10 and the third face 13. The actuator 1 of the first embodiment includes the first output member 50 attached to the second face 12 and the second output member 60 attached to the fourth face 14.

With such a configuration, the actuator 1 of the first embodiment can cause the first output member 50 and the second output member 60 to be displaced along the Y-axis and the X-axis, respectively, even with a simple structure including the flexible electrode 10, the first base electrode 20, and the second base electrode 30. Therefore, the actuator 1 of the first embodiment can more easily achieve movement with multiple degrees of freedom.

Furthermore, the actuator 1 of the first embodiment further includes the third base electrode 40 disposed to face the flexible electrode 10 on the Z-axis and is provided with the third insulating layers 43*a*, 43*b* on the opposite face 41 facing the flexible electrode 10. In actuator 1, the third space 44 is formed between the third insulating layers 43*a*, 43*b* and the flexible electrode 10, in which the flexible electrode 10 deforms toward the third insulating layers 43a, 43b by the voltage applied across the third base electrode 40 and the flexible electrode 10.

With such a configuration, the actuator 1 of the first embodiment can cause the flexible electrode 10 to deform along the Z-axis in addition to the X-axis and the Y-axis. The actuator 1 can cause the third output member 70 to be displaced along the Z-axis. Therefore, the actuator 1 of the first embodiment can easily achieve movement with greater degrees of freedom.

Other Embodiments

With reference to FIG. 14 to FIG. 19, an actuator 1 of each of the second to fifth embodiments will be described. In the descriptions of the second to fifth embodiments, descriptions of the configuration and operation equal to those of the first embodiment will be omitted.

Figure 14:
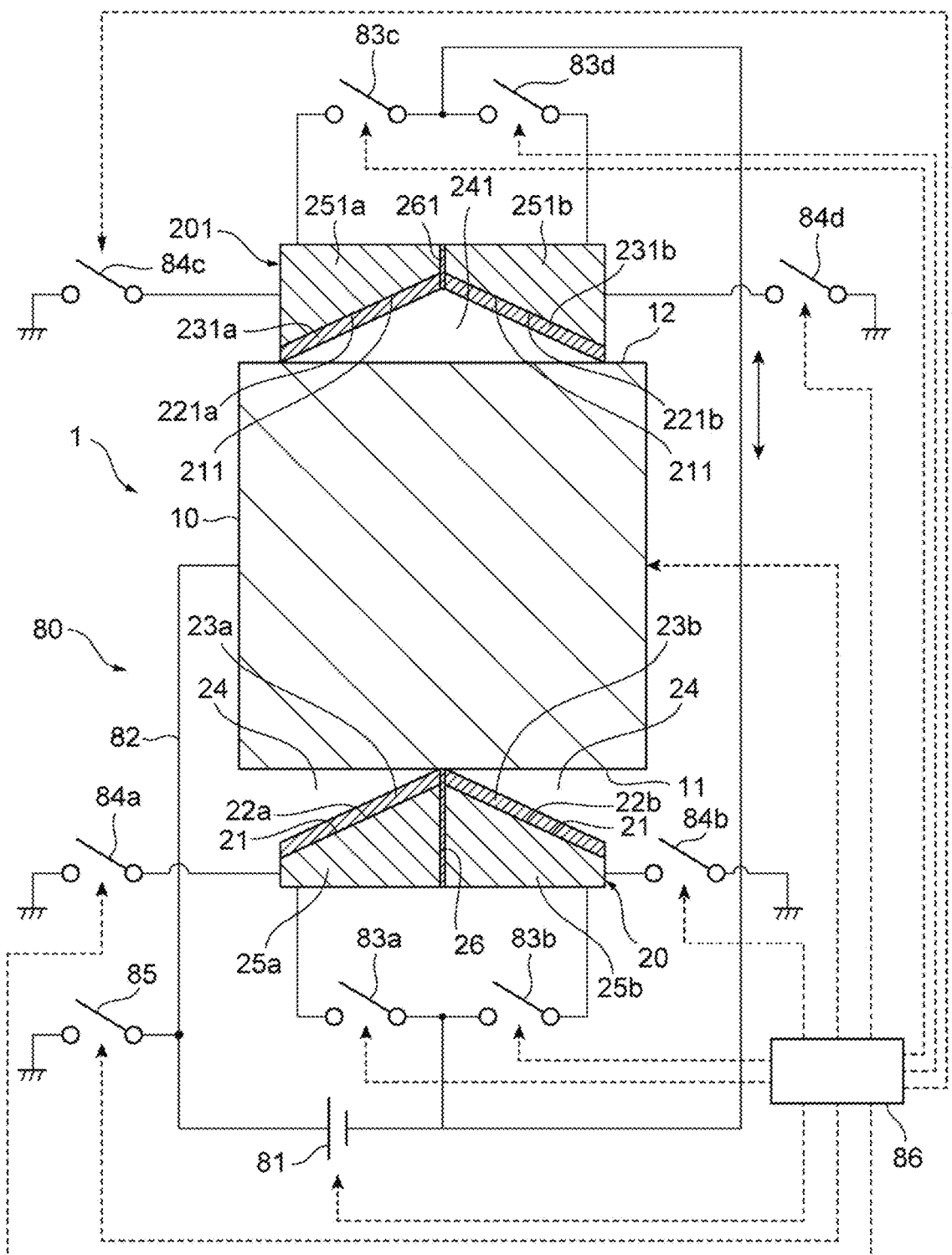
FIG. 14 is a schematic view of an actuator of a second embodiment.

FIG. 14 is a schematic view of an actuator 1 of the second embodiment. It should be noted that FIG. 14 corresponds to FIG. 3.

The actuator 1 of the second embodiment further includes a movable base electrode 201, which is different from the actuator 1 of the first embodiment. The movable base electrode 201 is an electrode that is disposed opposite to the first base electrode 20 with at least a portion of the flexible electrode 10 interposed therebetween on the Y-axis, and is adapted to be movable along the Y-axis with respect to the first base electrode 20.

The movable base electrode 201 includes an opposite face 211 facing the flexible electrode 10 in the same manner as the first base electrode 20. In the present embodiment, the opposite face 211 facing the flexible electrode 10 faces the second face 12 of the flexible electrode 10. The opposite face 211 facing the flexible electrode 10 is formed into a shape to fit into the opposite face 21 of the first base electrode 20 facing the flexible electrode 10. The opposite face 211 facing the flexible electrode 10 is provided with insulating layers 231a, 231b. In the same manner as the first insulating layers 23a, 23b, the insulating layers 231a, 231b are formed by using a ferroelectric material including ceramics. A space 241 is formed between the insulating layers 231a, 231b and the flexible electrode 10, in which the movable base electrode 201 moves by the voltage applied across the movable base electrode 201 and the flexible electrode 10. In the present embodiment, the space 241 is formed between the insulating layers 231a, 231b provided on the opposite face 211 of the movable base electrode 201 facing the flexible electrode 10 and the second face 12 of the flexible electrode 10.

In the same manner as the first base electrode 20, the movable base electrode 201 may be formed of a plurality of electrode portions 251a, 251b. The plurality of electrode portions 251a, 251b is insulated from each other by a plate-like insulating portion 261 and each of the plurality of electrode portions 251a, 251b may independently receive a voltage applied across the movable base electrode 201 and the flexible electrode 10. In the same manner as the plurality of electrode portions 25a, 25b forming the first base electrode 20, the plurality of electrode portions 251a, 251b respectively has inclined faces 221a, 221b that face the flexible electrode 10 and are inclined with respect to the flexible electrode 10. The inclined faces 221a, 221b are inclined with respect to the second face 12. The inclined face 221a and the inclined face 221b are inclined in the directions different from each other. The inclined face 221a is formed into a shape to fit into the inclined face 22a of the first base electrode 20. The inclined face 221b is formed into a shape to fit into the inclined face 22b of the first base electrode 20. The opposite face 211 formed of the inclined faces 221a, 221b facing the flexible electrode 10 is recessed in the +Y-axis direction and is formed into a valley shape having a ridge along the Z-axis.

The first output member 50 of the second embodiment may be attached to a face 271 of the movable base electrode 201. The face 271 of the movable base electrode 201 is a face positioned opposite to the opposite face 211 of the movable base electrode 201 in the direction along the Y-axis. Alternatively, the first output member 50 of the second embodiment may be attached to the second face 12 of the flexible electrode 10, not to the movable base electrode 201.

In the drive circuit 80 of the second embodiment, the flexible electrode 10 is coupled to one of the positive terminal and the negative terminal of the power supply 81. The first base electrode 20 and the movable base electrode 201 are coupled in parallel to the other one of the positive terminal and the negative terminal of the power supply 81. The electrode portion 25a and the electrode portion 25b forming the first base electrode 20 are coupled to each other in parallel to the other one of the positive terminal and the negative terminal of the power supply 81. The electrode portion 251a and the electrode portion 251b forming the movable base electrode 201 are coupled to each other in parallel to the other one of the positive terminal and the negative terminal of the power supply 81. The drive circuit 80 of the second embodiment further includes switches 83c, 83d, 84c, 84d, which is different from the drive circuit 80 of the first embodiment. The switch 83c is coupled between the electrode portion 251a and the power supply 81. The switch 83d is coupled between the electrode portion 251b and the power supply 81. The switch 84c is coupled between the electrode portion 251a and the frame ground (or earth). The switch 84d is coupled between the electrode portion 251b and the frame ground (or earth). The control unit 86 controls the ON/OFF state of the switches 83c, 83d, 84c, 84d independently.

In the actuator 1 of the second embodiment, when both of the switch 83a and the switch 83b are controlled to be in the ON state and the switches 84a, 84b, 85 are controlled to be in the OFF state, in the flexible electrode 10, the first face 11 deforms toward the first insulating layers 23a, 23b so as to adhere to the first insulating layers 23a, 23b. As a result, the second face 12 of the flexible electrode 10 deforms into a shape along the inclined faces 22a, 22b coated with the first insulating layers 23a, 23b (see FIG. 12).

In addition, in the actuator 1 of the second embodiment, when both of the switch 83c and the switch 83d are controlled to be in the ON state and the switches 84c, 84d are controlled to be in the OFF state, a Coulomb force is generated between the insulating layers 231a, 231b of the movable base electrode 201 and the flexible electrode 10. The direction of this Coulomb force is equal to the direction of the Coulomb force generated between the first insulating layers 23a, 23b of the first base electrode 20 and the flexible electrode 10. That is, in the actuator 1 of the second embodiment, the Coulomb force that causes the flexible electrode 10 to deform along the Y-axis can be enhanced as compared to the first embodiment. Then, the movable base electrode 201 moves toward the flexible electrode 10 such that the insulating layers 231a, 231b adhere to the second face 12 that has deformed into the shape along the inclined faces 221a, 221b. The first output member 50 attached to the face 271 of the movable base electrode 201 is displaced in the −Y-axis direction. The actuator 1 of the second embodiment can cause the first output member 50 to transitionally move along the Y-axis.

As described above, the actuator 1 of the second embodiment further includes the movable base electrode 201 that is disposed opposite to the first base electrode 20 with at least a portion of the flexible electrode 10 interposed therebetween on the Y-axis, and is adapted to move along the Y-axis with respect to the first base electrode 20. The movable base electrode 201 is formed into a shape to fit into the opposite face 21 of the first base electrode 20, and the opposite face 211 facing the flexible electrode 10 is provided with the insulating layers 231*a*, 231*b*. The space 241 is formed between the insulating layers 231*a*, 231*b* of the movable base electrode 201 and the flexible electrode 10, in which the movable base electrode 201 moves by the voltage applied across the movable base electrode 201 and the flexible electrode 10.

With such a configuration, the actuator 1 of the second embodiment can cause the Coulomb force generated between the insulating layers 231*a*, 231*b* of the movable base electrode 201 and the flexible electrode 10 to act on the flexible electrode 10. The direction of the Coulomb force generated between the insulating layers 231*a*, 231*b* of the movable base electrode 201 and the flexible electrode 10 is equal to the direction of the Coulomb force generated between the first insulating layers 23*a*, 23*b* of the first base electrode 20 and the flexible electrode 10. That is, the actuator 1 of the second embodiment can enhance the Coulomb force that causes the flexible electrode 10 to deform along the Y-axis. Since the actuator 1 of the second embodiment can enhance the power to cause the first output member 50 to be displaced along the Y-axis, it can have a higher output in the direction along the Y-axis. Therefore, the actuator 1 of the second embodiment can easily achieve movement with multiple degrees of freedom and can also increase an output.

Further, in the actuator 1 of the second embodiment, the opposite face 211 (i.e., the inclined faces 221*a*, 221*b*) of the movable base electrode 201 is formed into a shape to fit into the opposite face 21 (i.e., the inclined faces 22*a*, 22*b*) of the first base electrode 20. With this configuration, the actuator 1 of the second embodiment can further enhance the Coulomb force generated between the insulating layers 231*a*, 231*b* of the movable base electrode 201 and the flexible electrode 10. Since the actuator 1 of the second embodiment can further enhance the power to cause the first output member 50 to be displaced along the Y-axis, it can have an even higher output in the direction along the Y-axis. Therefore, the actuator 1 of the second embodiment can easily achieve movement with multiple degrees of freedom and can further increase an output.

It should be noted that in the above descriptions, the actuator 1 of the second embodiment includes the movable base electrode 201 that is disposed opposite to the first base electrode 20 with at least a portion of the flexible electrode 10 interposed therebetween on the Y-axis. However, the actuator 1 of the second embodiment is not limited to this, and may further include a movable base electrode that is disposed opposite to the second base electrode 30 with at least a portion of the flexible electrode 10 interposed therebetween on the X-axis. In addition, the actuator 1 of the second embodiment may further include a movable base electrode that is disposed opposite to the third base electrode 40 with at least a portion of the flexible electrode 10 interposed therebetween on the Z-axis.

Figure 15:
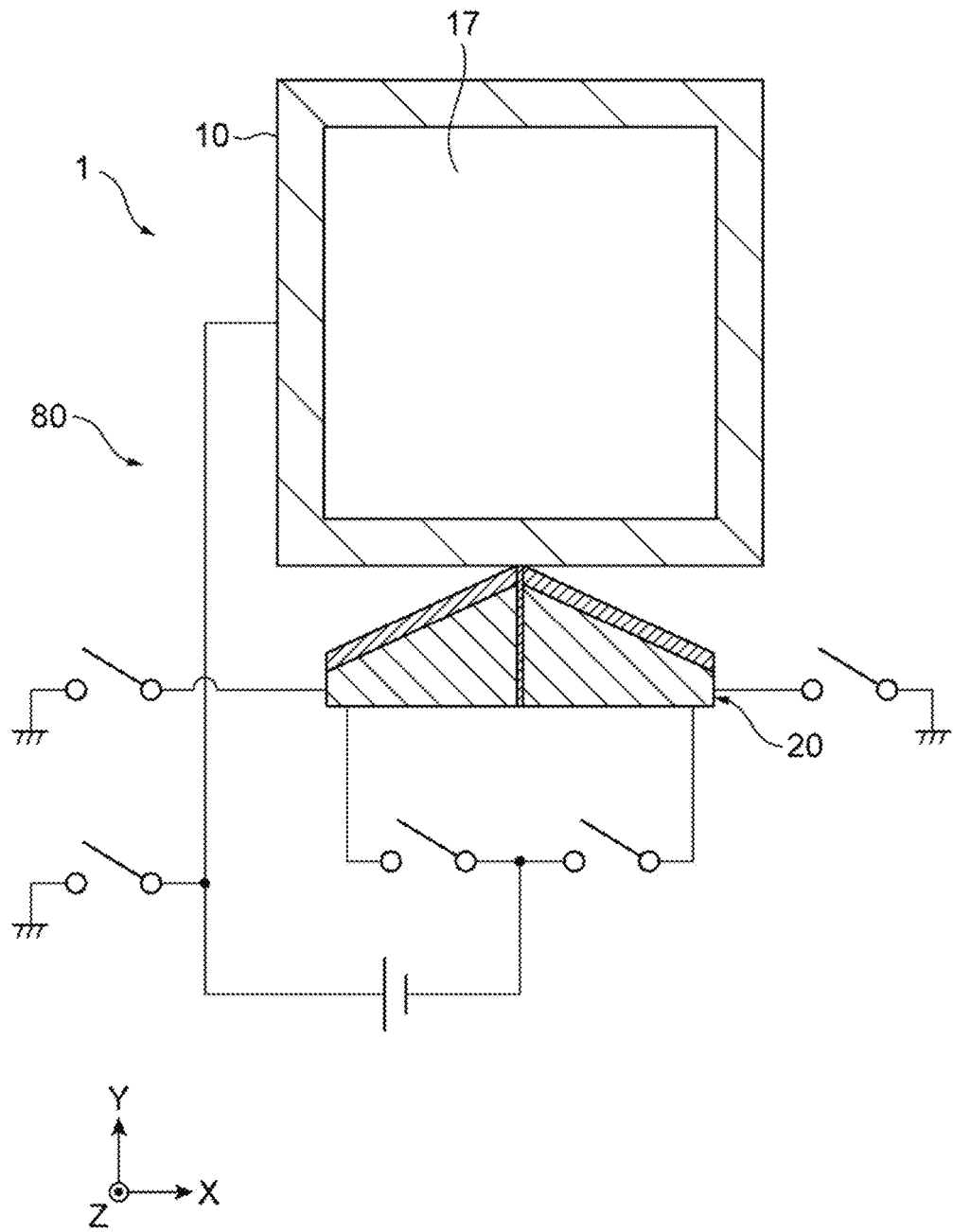
FIG. 15 is a schematic view of an actuator of a third embodiment.

FIG. 15 is a schematic view of an actuator 1 of the third embodiment. It should be noted that FIG. 15 corresponds to FIG. 3. The illustration of the control unit 86 is omitted in FIG. 15.

The actuator 1 of the third embodiment has an inner space 17 in the flexible electrode 10. That is, the flexible electrode 10 of the third embodiment has a hollow structure. With this configuration, the flexible electrode 10 of the third embodiment can deform more easily as compared to the flexible electrode 10 with a solid structure. Accordingly, the actuator 1 of the third embodiment can cause the flexible electrode 10 to deform even if a voltage applied to the flexible electrode 10 is reduced. This can reduce power consumption and easily ensure insulation, and thus can increase safety. In addition, the actuator 1 of the third embodiment can reduce its weight and cost as compared to the one in which the flexible electrode 10 has a solid structure. Therefore, the actuator 1 of the third embodiment can achieve movement with multiple degrees of freedom even more easily and safely.

Figure 16:
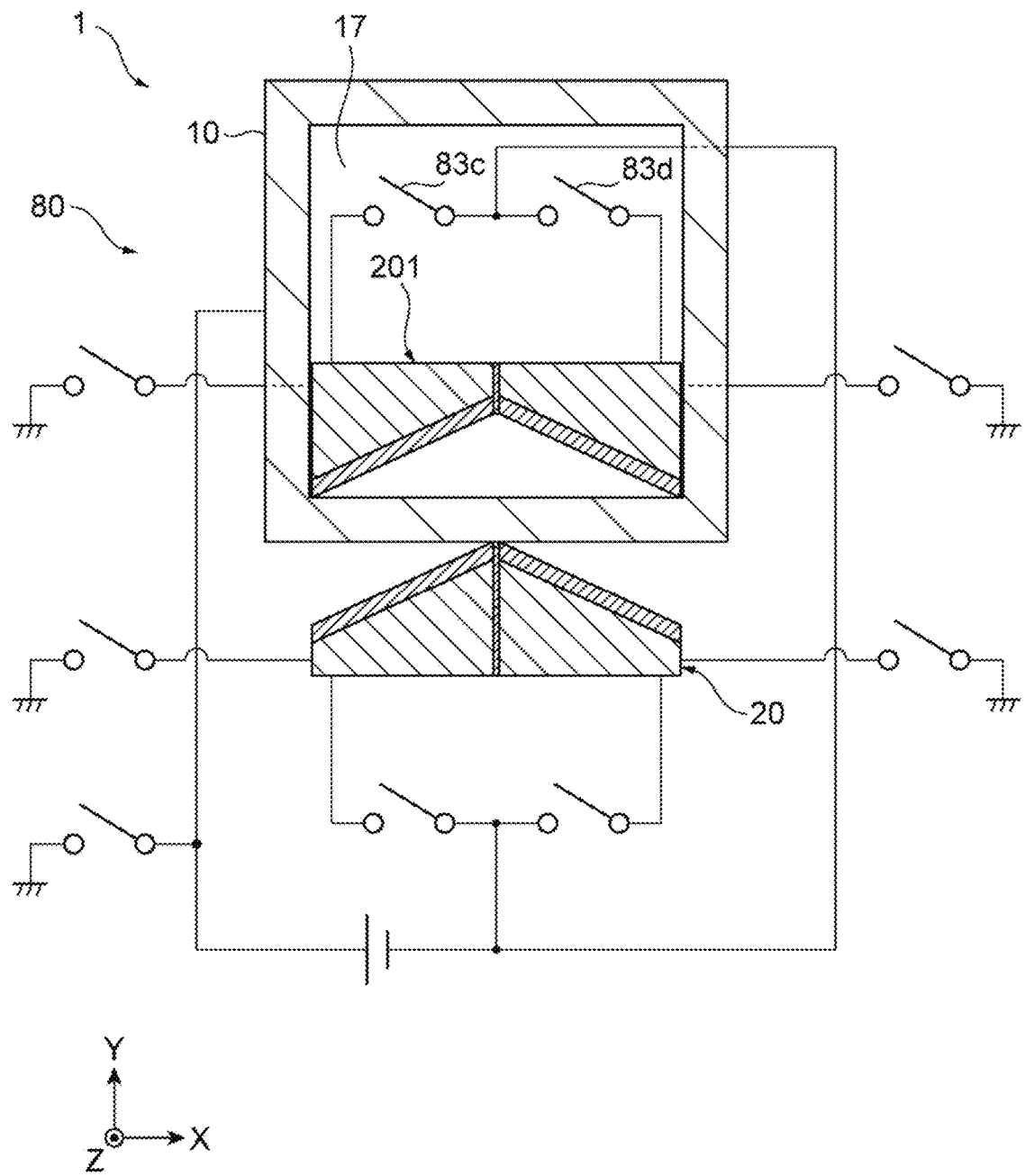
FIG. 16 is a schematic view of an actuator of a fourth embodiment.

FIG. 16 is a schematic view of an actuator 1 of the fourth embodiment. It should be noted that FIG. 16 corresponds to FIG. 14. The illustration of the control unit 86 is omitted in FIG. 16.

The actuator 1 of the fourth embodiment includes the inner space 17 in the flexible electrode 10 as in the third embodiment. The actuator 1 of the fourth embodiment includes the movable base electrode 201 as in the second embodiment. Furthermore, the actuator 1 of the fourth embodiment includes the movable base electrode 201 disposed in the inner space 17. With this configuration, the actuator 1 of the fourth embodiment can reduce its size as compared to the one in which the movable base electrode 201 is disposed outside of the flexible electrode 10. Therefore, the actuator 1 of the fourth embodiment can easily achieve movement with multiple degrees of freedom and can achieve downsizing. It should be noted that in the drive circuit 80 of the fourth embodiment, the switches 83*c*, 83*d* may be disposed in the inner space 17 of the flexible electrode 10 as illustrated in FIG. 16, or may be disposed outside of the flexible electrode 10.

Figure 17:
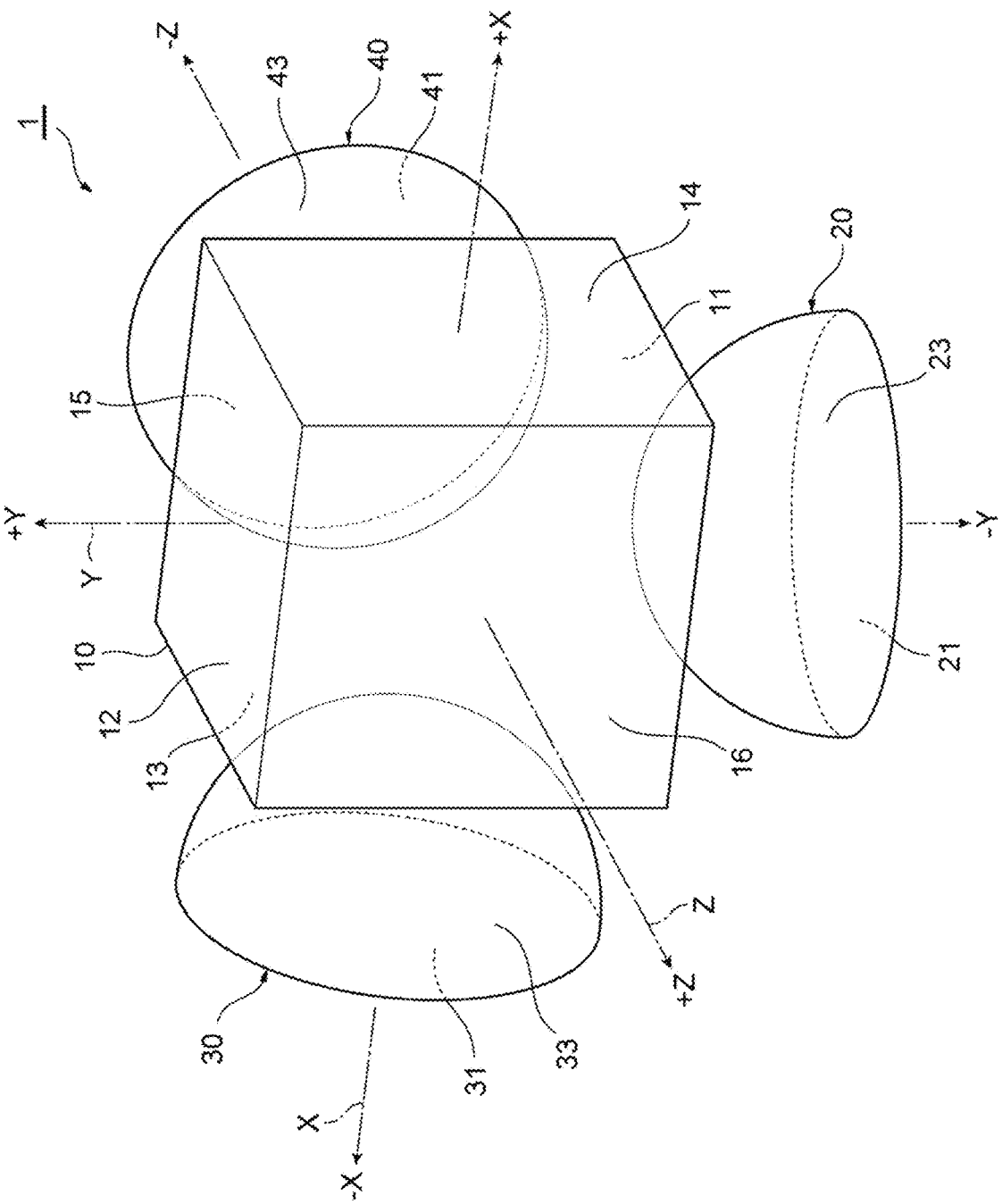
FIG. 17 is a schematic view of an actuator of a fifth embodiment.
Figure 18:
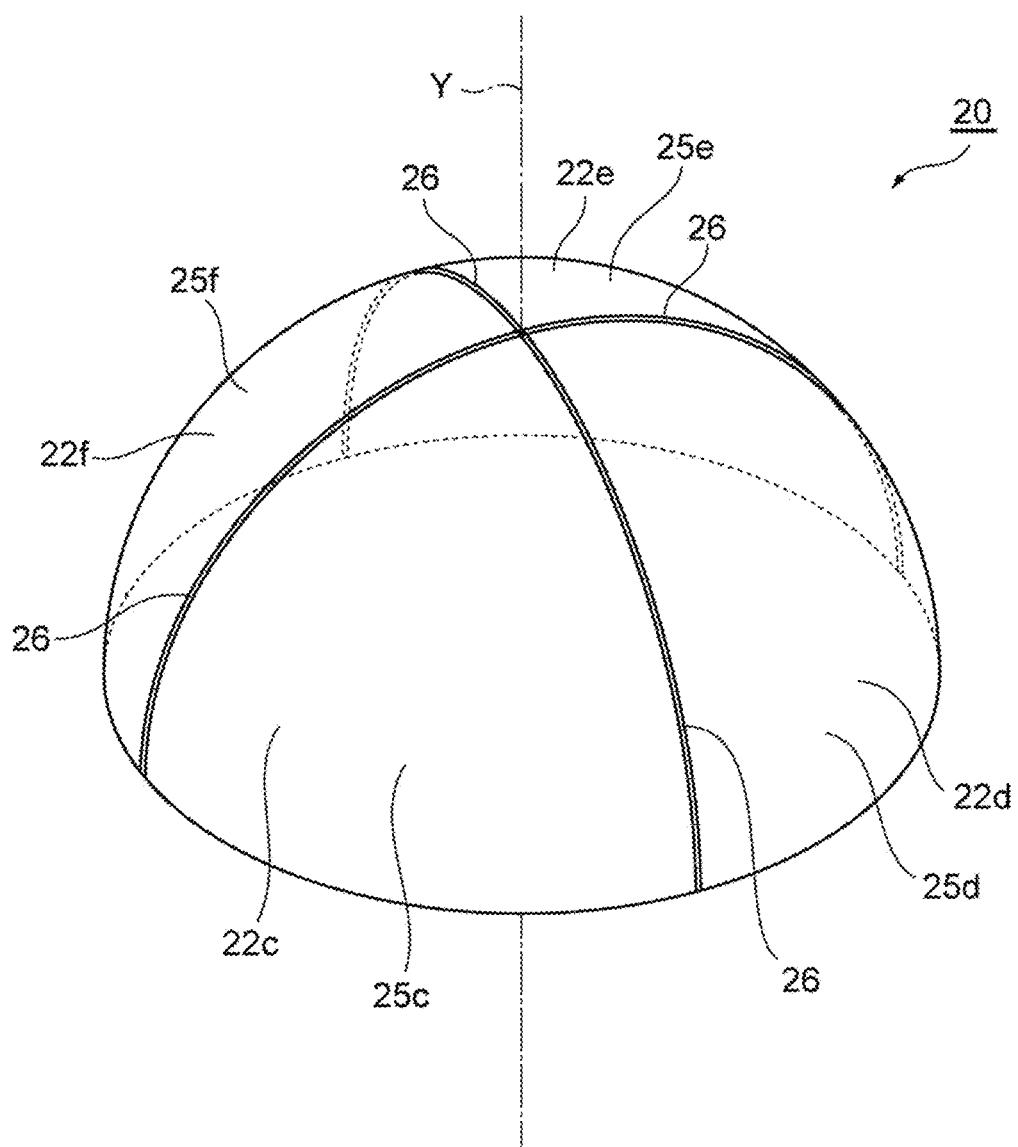
FIG. 18 is a schematic view of a first base electrode illustrated in FIG. 17.
Figure 19:
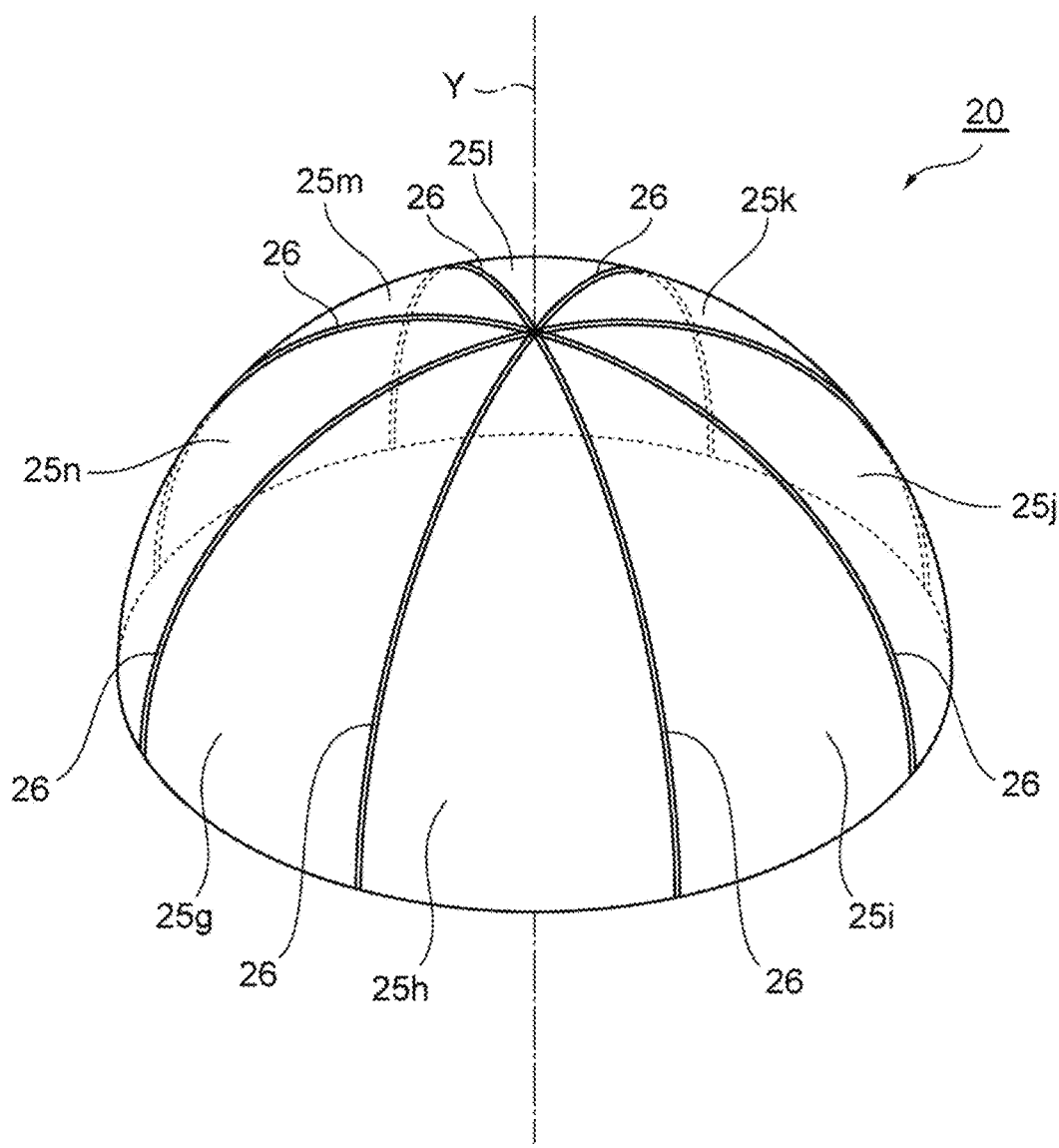
FIG. 19 is a schematic view of another example of the first base electrode illustrated in FIG. 18.

FIG. 17 is a schematic view of an actuator 1 of the fifth embodiment. FIG. 18 is a schematic view of the first base electrode 20 illustrated in FIG. 17. FIG. 19 is a schematic view of another example of the first base electrode 20 illustrated in FIG. 18. It should be noted that FIG. 17 corresponds to FIG. 1. The illustration of the first insulating layer 23 is omitted in FIG. 18 and FIG. 19.

In the actuator 1 of the fifth embodiment, the base electrodes 20 to 40 each are formed into a dome shape, such as a hemisphere. The first base electrode 20 of the fifth embodiment is disposed such that the top portion of the dome faces the first face 11 of the flexible electrode 10 and the central axis of the dome is along the Y-axis. The second base electrode 30 of the fifth embodiment is disposed such that the top portion of the dome faces the third face 13 of the flexible electrode 10 and the central axis of the dome is along the X-axis. The third base electrode 40 of the fifth embodiment is disposed such that the top portion of the dome faces the fifth face 15 of the flexible electrode 10 and the central axis of the dome is along the Z-axis.

The first base electrode 20 of the fifth embodiment includes the opposite face 21 facing the flexible electrode 10 as in the first embodiment. The opposite face 21 facing the flexible electrode 10 is provided with the first insulating layer 23. The first insulating layer 23 is formed by using a ferroelectric material including ceramics as in the first embodiment. The first space 24 is formed between the first insulating layer 23 and the flexible electrode 10, in which the flexible electrode 10 deforms toward the first insulating layer 23 by the voltage applied across the first base electrode 20 and the flexible electrode 10.

In the same manner as the first base electrode 20 of the fifth embodiment, the second base electrode 30 of the fifth embodiment includes the opposite face 31 facing the flexible electrode 10. The opposite face 31 facing the flexible electrode 10 is provided with the second insulating layer 33. In the same manner as the first insulating layer 23, the second insulating layer 33 is formed by using a ferroelectric material including ceramics. The second space 34 is formed between the second insulating layer 33 and the flexible electrode 10, in which the flexible electrode 10 deforms toward the second insulating layer 33 by the voltage applied across the second base electrode 30 and the flexible electrode 10.

In the same manner as the first base electrode 20 of the fifth embodiment, the third base electrode 40 of the fifth embodiment includes the opposite face 41 facing the flexible electrode 10. The opposite face 41 facing the flexible electrode 10 is provided with the third insulating layer 43. In the same manner as the first insulating layer 23, the third insulating layer 43 is formed by using a ferroelectric material including ceramics. The third space 44 is formed between the third insulating layer 43 and the flexible electrode 10, in which the flexible electrode 10 deforms toward the third insulating layer 43 by the voltage applied across the third base electrode 40 and the flexible electrode 10.

Furthermore, as illustrated in FIG. 18, the first base electrode 20 of the fifth embodiment may be formed of a plurality of electrode portions 25c to 25f as in the first embodiment. The plurality of electrode portions 25c to 25f is insulated from each other by the plate-like insulating portion 26 and each of the plurality of electrode portions 25c to 25f may independently receive a voltage applied across the first base electrode 20 and the flexible electrode 10. As in the first embodiment, the plurality of electrode portions 25c to 25f respectively has inclined faces 22c to 22f that face the flexible electrode 10 and are inclined with respect to the flexible electrode 10. The inclined faces 22c to 22f are inclined in the directions different from each other. The plurality of electrode portions 25c to 25f is disposed along the direction rotating about the Y-axis (yaw direction). The plurality of electrode portions 25c to 25f may be formed by dividing the hemispherical first base electrode 20 at regular intervals in the direction rotating about the Y-axis.

In the same manner as the first base electrode 20 of the fifth embodiment, the second base electrode 30 of the fifth embodiment may be formed of a plurality of electrode portions, which is insulated from each other and is adapted to independently receive a voltage applied across the second base electrode 30 and the flexible electrode 10. In the same manner as the plurality of electrode portions 25c to 25f, the plurality of electrode portions forming the second base electrode 30 of the fifth embodiment respectively has inclined faces that face the flexible electrode 10 and are inclined with respect to the flexible electrode 10. The plurality of electrode portions forming the second base electrode 30 of the fifth embodiment is disposed along the direction rotating about the X-axis (pitch direction).

In the same manner as the first base electrode 20 of the fifth embodiment, the third base electrode 40 of the fifth embodiment may be formed of a plurality of electrode portions, which is insulated from each other and is adapted to independently receive a voltage applied across the third base electrode 40 and the flexible electrode 10. In the same manner as the plurality of electrode portions 25c to 25f, the plurality of electrode portions forming the third base electrode 40 of the fifth embodiment respectively has inclined faces that face the flexible electrode 10 and are inclined with respect to the flexible electrode 10. The plurality of electrode portions forming the third base electrode 40 of the fifth embodiment is disposed along the direction rotating about the Z-axis (roll direction).

As described above, in the actuator 1 of the fifth embodiment, the plurality of electrode portions 25c to 25f forming the first base electrode 20 is disposed along the direction rotating about the Y-axis, and the plurality of electrode portions forming the second base electrode 30 is disposed along the direction rotating about the X-axis.

With such a configuration, the first base electrode 20 of the fifth embodiment can sequentially apply a voltage or sequentially stop application of the voltage across the first base electrode 20 and the flexible electrode 10 for each of the plurality of electrode portions 25c to 25f along the direction rotating about the Y-axis. The first base electrode 20 of the fifth embodiment can sequentially cause the flexible electrode 10 to deform toward each of the plurality of electrode portions 25c to 25f disposed along the direction rotating about the Y-axis. Accordingly, the first base electrode 20 of the fifth embodiment can cause the first output member 50 to be displaced to precess about the Y-axis as a rotation axis. Likewise, also when the second base electrode 30 is formed of a plurality of electrode portions as described above, the second base electrode 30 can cause the second output member 60 to be displaced to precess about the X-axis as a rotation axis. Therefore, the actuator 1 of the fifth embodiment can easily achieve various types of movement, in addition to the transitional movement along the X-axis or the Y-axis.

It should be noted that by equally applying a voltage, which is applied across the first base electrode 20 and the flexible electrode 10, to all of the plurality of electrode portions 25c to 25f, the first base electrode 20 of the fifth embodiment can cause the first output member 50 to transitionally move along the Y-axis. By applying a voltage, which is applied across the first base electrode 20 and the flexible electrode 10, to one of the plurality of electrode portions 25c to 25f, the first base electrode 20 of the fifth embodiment can cause the first output member 50 to rotate in the direction (the direction crossing the Y-axis) toward the inclined face of the one electrode portion. By alternately applying a voltage, which is applied across the first base electrode 20 and the flexible electrode 10, to one and another one of the plurality of electrode portions 25c to 25f, the first base electrode 20 of the fifth embodiment can cause the first output member 50 to swing in the direction crossing the Y-axis. That is, the actuator 1 of the fifth embodiment can cause the first output member 50 to not only transitionally move along the Y-axis but also to rotate or swing in the direction crossing the Y-axis. In the same manner as the first output member 50, the actuator 1 of the fifth embodiment can cause the second output member 60 to not only transitionally move along the X-axis but also to rotate or swing in the direction crossing the X-axis. In the same manner as the first output member 50, the actuator 1 of the fifth embodiment can cause the third output member 70 to not only transitionally move along the Z-axis but also to rotate or swing in the direction crossing the Z-axis.

The number of electrode portions forming the base electrodes 20 to 40 of the fifth embodiment is not particularly limited. For example, the first base electrode 20 of the fifth embodiment may be formed of a plurality of electrode portions 25g to 25n as illustrated in FIG. 19. The plurality of electrode portions 25g to 25n is insulated from each other by the plate-like insulating portion 26 and each of the plurality of electrode portions 25g to 25n may independently receive a voltage applied across the first base electrode 20 and the flexible electrode 10. As the number of electrode portions forming the base electrodes 20 to 40 increases, the flexible electrode 10 can deform in a more complicated and fine manner, thus allowing the output members 50 to 70 to be displaced in a complicated and fine manner.

Although the embodiments of the present disclosure have been described in detail above, the present disclosure is not limited to the above embodiments, and various design changes are possible in so far as they are within the spirit of the present disclosure in the scope of the claims. In the present disclosure, it is possible to add, to a structure of an embodiment, a structure of another embodiment, to replace a structure of an embodiment with a structure of another embodiment, or to delete a part of a structure of an embodiment.

What is claimed is:

1. An actuator comprising:
a flexible electrode having flexibility;
a first base electrode disposed to face the flexible electrode on a first axis and provided with a first insulating layer on an opposite face facing the flexible electrode;
a second base electrode disposed to face the flexible electrode on a second axis crossing the first axis at an origin located at the center of the flexible electrode and provided with a second insulating layer on an opposite face facing the flexible electrode; and
an output member adapted to be displaced according to deformation of the flexible electrode and output work to an outside,
wherein:
a first space is formed between the first insulating layer and the flexible electrode, in which the flexible electrode deforms toward the first insulating layer by a voltage applied across the first base electrode and the flexible electrode, and
a second space is formed between the second insulating layer and the flexible electrode, in which the flexible electrode deforms toward the second insulating layer by a voltage applied across the second base electrode and the flexible electrode.

2. The actuator according to claim 1, wherein the first base electrode and the second base electrode each include a plurality of electrode portions adapted to independently receive the voltage.

3. The actuator according to claim 2, wherein:
each of the plurality of electrode portions has an inclined face that faces the flexible electrode and is inclined with respect to the flexible electrode, and
the inclined faces of the plurality of electrode portions are inclined in directions different from each other.

4. The actuator according to claim 2, wherein:
the plurality of electrode portions forming the first base electrode is disposed along a direction rotating about the first axis, and
the plurality of electrode portions forming the second base electrode is disposed along a direction rotating about the second axis.

5. The actuator according to claim 1, wherein the flexible electrode has a hollow structure.

6. The actuator according to claim 1, further comprising a movable base electrode disposed opposite to the first base electrode with at least a portion of the flexible electrode interposed therebetween on the first axis and adapted to move along the first axis with respect to the first base electrode,
wherein:
the movable base electrode is provided with an insulating layer on an opposite face facing the flexible electrode, and
a space is formed between the insulating layer of the movable base electrode and the flexible electrode, in which the movable base electrode moves by a voltage applied across the movable base electrode and the flexible electrode.

7. The actuator according to claim 1, wherein:
the flexible electrode is formed into a hexahedron, the hexahedron including a first face crossing the first axis, a second face facing the first face on the first axis, a third face crossing the second axis, and a fourth face facing the third face on the second axis,
the opposite face of the first base electrode facing the flexible electrode faces the first face,
the first space is formed between the first insulating layer provided on the opposite face of the first base electrode facing the flexible electrode and the first face,
the opposite face of the second base electrode facing the flexible electrode faces the third face,
the second space is formed between the second insulating layer provided on the opposite face of the second base electrode facing the flexible electrode and the third face, and
the output member includes a first output member attached to the second face and a second output member attached to the fourth face.

8. The actuator according to claim 1, further comprising a third base electrode disposed to face the flexible electrode on a third axis crossing each of the first axis and the second axis and provided with a third insulating layer on an opposite face facing the flexible electrode,
wherein a third space is formed between the third insulating layer and the flexible electrode, in which the flexible electrode deforms toward the third insulating layer by a voltage applied across the third base electrode and the flexible electrode.

* * * * *